(12) United States Patent
Walch et al.

(10) Patent No.: US 9,396,140 B1
(45) Date of Patent: Jul. 19, 2016

(54) METHOD AND APPARATUS FOR TRANSFERRING FRAMES WITH DIFFERENT WORLD WIDE NAME ADDRESSES AND CONNECTION RATES BETWEEN INITIATORS OF A HOST DEVICE AND A PORT

(71) Applicant: Marvell International LTD., Hamilton (BM)

(72) Inventors: James A. Walch, Mission Viejo, CA (US); Leon A. Krantz, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 101 days.

(21) Appl. No.: 14/532,155

(22) Filed: Nov. 4, 2014

Related U.S. Application Data

(63) Continuation of application No. 13/047,115, filed on Mar. 14, 2011, now Pat. No. 8,880,812.

(60) Provisional application No. 61/319,748, filed on Mar. 31, 2010.

(51) Int. Cl.
*G06F 13/24* (2006.01)
*G06F 3/06* (2006.01)

(52) U.S. Cl.
CPC ............... *G06F 13/24* (2013.01); *G06F 3/061* (2013.01); *G06F 3/0644* (2013.01); *G06F 3/0689* (2013.01)

(58) Field of Classification Search
CPC ....... G06F 13/24; G06F 3/061; G06F 3/0644; G06F 3/0689; G06F 3/067; G06F 3/0613; G06F 3/0632; G06F 3/0659
See application file for complete search history.

(56) References Cited

U.S. PATENT DOCUMENTS

| | | | |
|---|---|---|---|
| 5,883,855 A | 3/1999 | Fujita | |
| 6,343,324 B1 * | 1/2002 | Hubis | G06F 3/0622 709/229 |
| 7,337,277 B2 | 2/2008 | Benhase et al. | |
| 7,363,391 B2 * | 4/2008 | Shimizu | G06F 3/0611 710/39 |
| 7,707,338 B1 | 4/2010 | Walch et al. | |
| 7,924,763 B2 * | 4/2011 | Nimbalker | H04L 1/0069 370/315 |

(Continued)

OTHER PUBLICATIONS

Chanik Park; Talawar, P.; Daesik Won; Myung Jin Jung; Jung Been Im; Suksan Kim; Youngjoon Choi, "A High Performance Controller for NAND Flash-Based Solid State Disk (NSSD), " Non-Volatile Semiconductor Memory Workshop, 2006. IEEE NVSMW 2006. $21^{st}$, vol., No. pp. 17,20, Feb. 12-16, 2006.

*Primary Examiner* — David X Yi
*Assistant Examiner* — Ramon A Mercado

(57) ABSTRACT

A system including a memory with arrays, a register, and a port. The memory stores an interrupt service routine (ISR). The arrays store respective fields. The port is connected to initiators of a host device and includes a physical layer (PHY) device and a control module. The PHY device: transfers a first frame between the port and a first initiator; and transfers a second frame between the port and the first or a second initiator. The frames include first and second information including respective world wide name addresses and connection rates. The PHY device: compares the first and second information; if there is not a match, interrupts servicing the first frame; and stores an index value for one of the arrays in the register. The control module, based on the index value, executes the ISR to service the second frame based on the fields in the one of the arrays.

20 Claims, 19 Drawing Sheets

(56) References Cited

U.S. PATENT DOCUMENTS

| | | | | |
|---|---|---|---|---|
| 8,880,812 B1* | 11/2014 | Walch | ................... | G06F 3/0613 707/610 |
| 2004/0205259 A1* | 10/2004 | Galloway | .............. | G06F 13/387 710/3 |
| 2004/0248582 A1* | 12/2004 | Belaiche | .............. | H04B 7/2612 455/450 |
| 2005/0105605 A1* | 5/2005 | Morsberger | .......... | H04L 1/0043 375/225 |
| 2005/0154828 A1* | 7/2005 | Sugino | ................... | G06F 3/0605 711/114 |
| 2006/0015654 A1* | 1/2006 | Krantz | ................... | G06F 3/0605 710/5 |
| 2006/0089934 A1* | 4/2006 | Jibbe | ................... | G06F 11/2247 |
| 2007/0192639 A1 | 8/2007 | Nichols et al. | | |
| 2008/0010427 A1* | 1/2008 | Kamano | ................ | G06F 3/0601 711/163 |
| 2008/0244139 A1* | 10/2008 | Nakajima | ............. | G06F 3/0613 710/300 |

* cited by examiner

| Byte Offset | WWN Table Field Name |
|---|---|
| 0 | WWN Entry State |
| 1 | WWN Table Index |
| 2 | ICT High |
| 3 | ICT Low |
| 4 | WWN Byte 0 |
| 5 | WWN Byte 1 |
| 6 | WWN Byte 2 |
| 7 | WWN Byte 3 |
| 8 | WWN Byte 4 |
| 9 | WWN Byte 5 |
| 10 | WWN Byte 6 |
| 11 | WWN Byte 7 |
| 12 | Connection Rate |
| 13 | SAS Hash Address High |
| 14 | SAS Hash Address Mid |
| 15 | SAS Hash Address Low |
| 16 | Arbitration Wait Time High |
| 17 | Arbitration Wait Time Low |
| 18 | Nexus Time High |
| 19 | Nexus Time Low |
| 20 | Pathway Blocked Time |
| 21 | Active Command Count |

FIG. 8

METHOD AND APPARATUS FOR TRANSFERRING FRAMES WITH DIFFERENT WORLD WIDE NAME ADDRESSES AND CONNECTION RATES BETWEEN INITIATORS OF A HOST DEVICE AND A PORT

CROSS-REFERENCE TO RELATED APPLICATIONS

The present disclosure is a continuation of U.S. patent application Ser. No. 13/047,115 (now U.S. Pat. No. 8,880, 812), filed Mar. 14, 2011. This application claims the benefit of U.S. Provisional Application No. 61/319,748, filed Mar. 31, 2010. The disclosures of the applications referenced above are incorporated herein by reference.

This application is related to U.S. Non-Provisional patent application Ser. No. 11/715,568 (now U.S. Pat. No. 7,707, 338), filed Mar. 8, 2007, which claims the benefit of U.S. Provisional Application Nos. 60/799,152, filed May 10, 2006 and 60/789,836, filed Apr. 6, 2006.

FIELD

The present disclosure relates managing data flow in a data storage controller of a multi-initiator environment.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A small computer systems interface ("SCSI") allows a computer to communicate with peripheral devices, such as disk drives, tape drives, compact disc-read only memory (CD-ROM) drives, printers and scanners. A serial attached SCSI (SAS) interface interconnects a network of storage devices with processing devices. A SAS interface includes storage devices that manage concurrent data transfer routines to one or more independent (distinct) initiators.

An initiator may be a port of, for example, a workstation, a server, and/or a computer. An initiator may determine a topology of devices in a network (e.g., discover other storage and processing devices). Once the topology is determined the initiator may establish contacts with a SAS interface module. The SAS interface module manages a world wide name ("WWN") table. The WWN table includes identification information for each initiator.

In FIG. 1, a network system 10 is shown that includes one or more initiators 12-1, 12-2, . . . , 12-X (collectively initiators 12). The initiators include respective initiator memory modules 13-1, 13-2, . . . , 13-X. The initiators 12 may be connected to a SAS module 14 via an expander 16. The expander 16 may be an input/output control device that receives and routes data packets.

In operation, for example, the initiator 12-1 may issue an "open" request (i.e., a SAS OPEN address frame) to establish or reestablish a connection with the SAS module 14. The SAS module 14 may establish or re-establish the connection using and updating information associated with the initiator and stored in a WWN table.

A SAS module 14 may include a serializer/deserializer (SERDES) 20 that (i) converts serial data from the initiator 12 or expander 16 to parallel data and (ii) parallel data from a link module 22 of a port 23 to serial data. The link module 22 includes link memory 24 with a WWN table 25 of WWN address registers 26-1, 26-2, . . . , 26-Y (collectively registers 26). The WWN table 25 may have a fixed size that is limited. The link module 22 services initiator connection requests by storing and/or accessing source and destination WWN SAS addresses in the WWN address registers 26. The link module 22 manages concurrent connection requests for a limited number of WWN table entries (e.g., 8, 16 or 32 entries). If the internal WWN table is full, the link module 22 rejects additional connection requests until space is available.

In FIG. 2, another network system 10' is shown and includes the initiators 12 with the memory modules 13. The initiators 12 are connected to a SAS module 14' via an expander 16. The SAS module 14' includes the SERDES 20 and a port 23'. The port 23' includes a link module 22' with link memory 24' and a control module 32. The link memory 24' stores a first WWN table 25'. The control module 32 includes program code memory 34 that stores a second WWN table 36.

If the first WWN table 25' is full, the link module 22' may manage and queue additional entries using the program code memory 34 within the control module 32. The control module 32 allocates memory space to store the additional entries in the second WWN table 36. Managing multiple WWN tables at separate locations slows connection request response time of the link module 22.

SUMMARY

A serial attached small computer systems interface (SAS) module is provided and includes a first port with (i) a first physical layer device and (ii) a first port control module. The first physical layer device communicates with a plurality of initiators. The first port control module comprises a first world wide number (WWN) table. The first WWN table comprises connection rates of the plurality of initiators during communication with the first physical layer device. Each of the connection rates is a last connection rate of a respective one of the plurality of initiators.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 8 is a WWN table entry (array) for an initiator in accordance with the present disclosure;

DESCRIPTION

Figure 1:
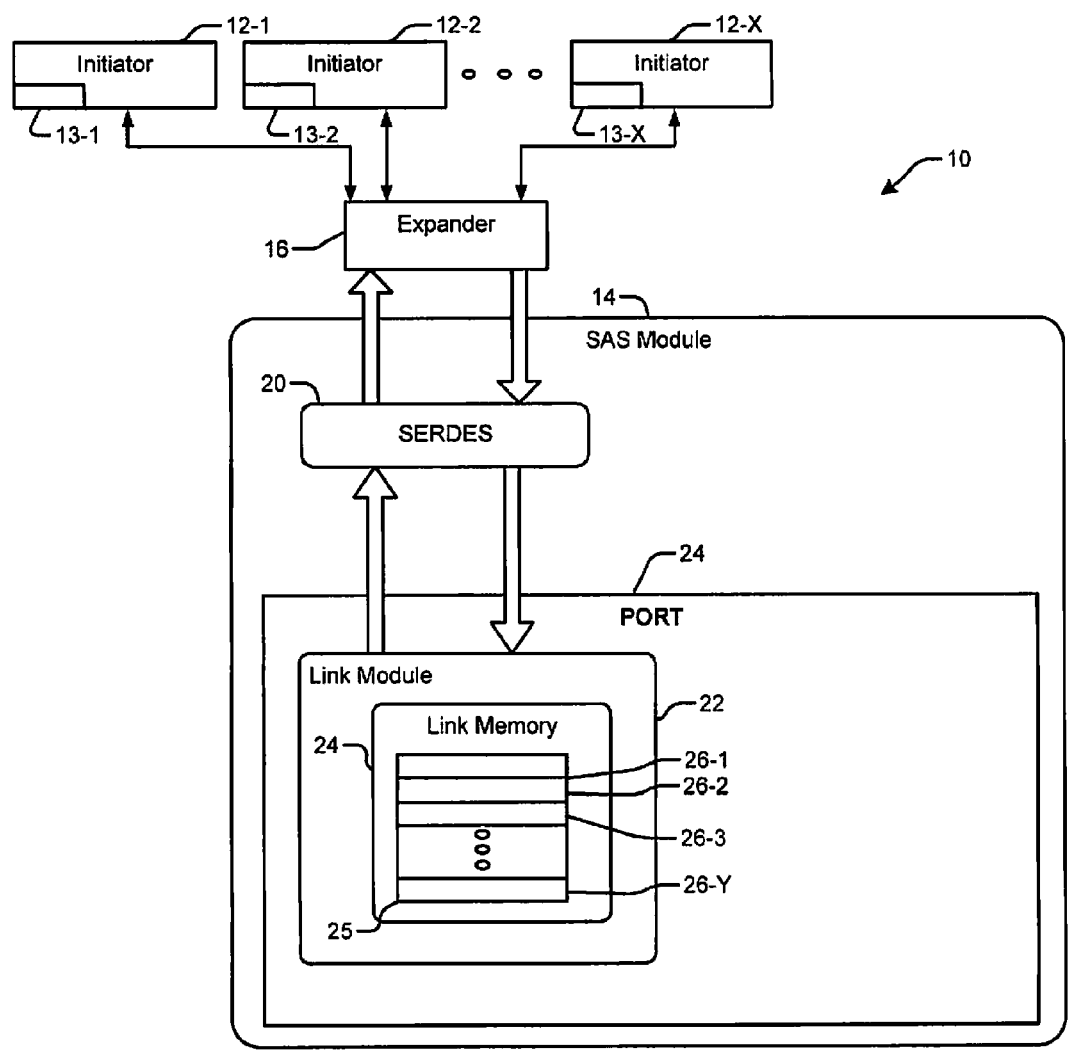
FIG. 1 is a functional block diagram of a network system according to the prior art.
Figure 2:
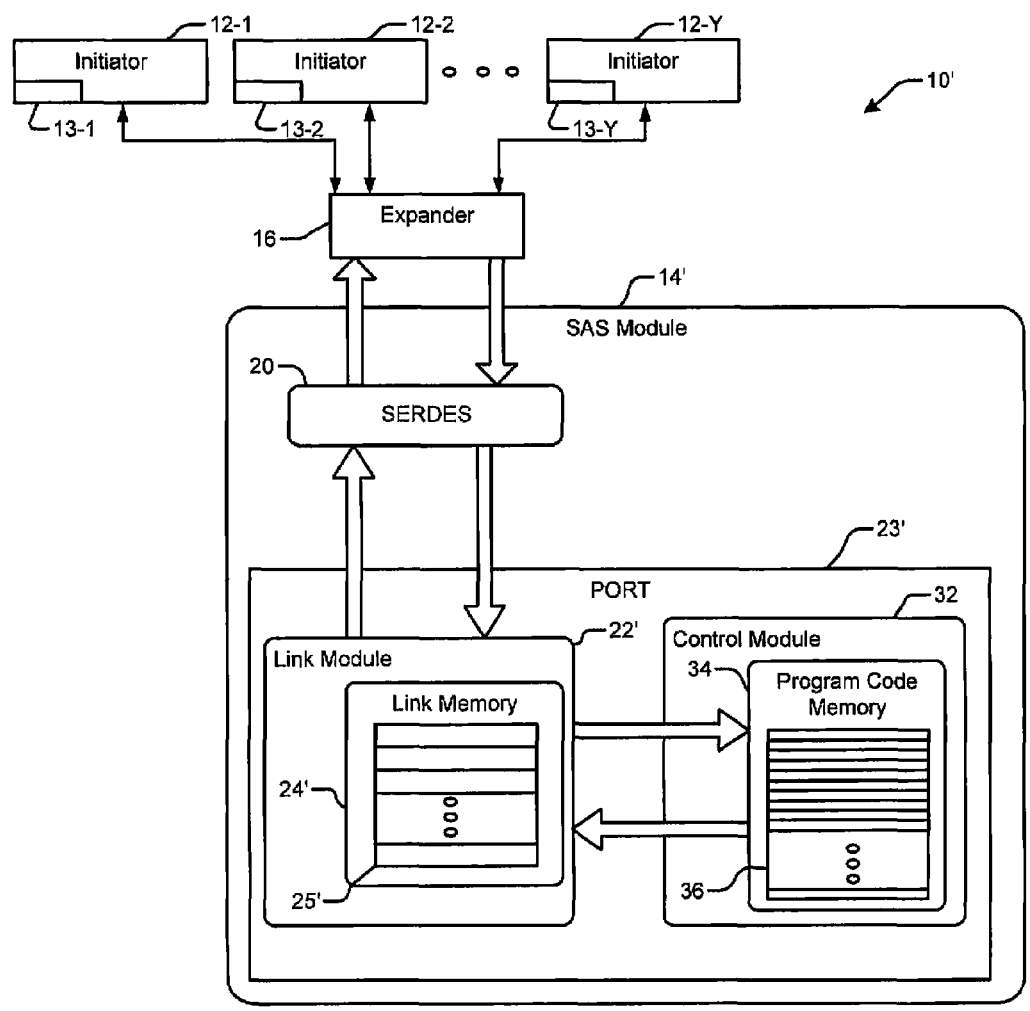
FIG. 2 is a functional block diagram of another network system according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure includes systems and methods for dynamically managing connection requests in a data storage controller within a multiple initiator device environment. The data storage controller may include a data storage protocol layer, a link interface or physical layer, and a control module dedicated to service the physical layer. The data storage protocol layer may be a small computer systems interface ("SCSI"), a serial attached SCSI ("SAS"), or a Fibre Channel interface but is not limited to these storage protocol examples. The control module includes buffers having service routines driven by integrated interrupts. The control module dynamically translates and manages identification information from an initiator.

Figure 3:
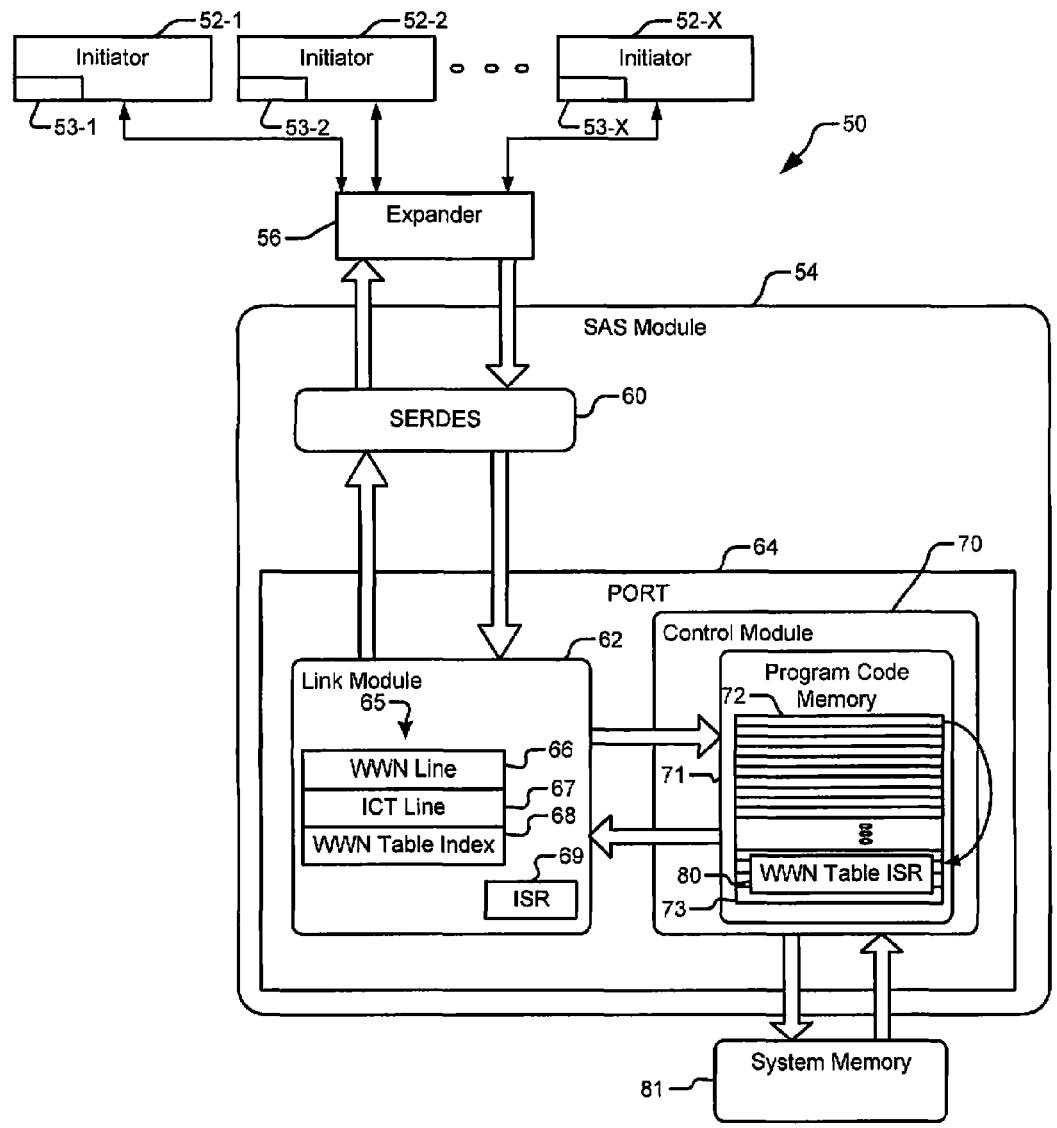
FIG. 3 is a functional block diagram of a network system in accordance with the present disclosure.

In FIG. 3, a network system 50 is shown and includes one or more ports or initiators 52-1, 52-2, . . . , 52-X (collectively initiators 52). The initiators 52 include respective memory modules 53-1, 53-2, . . . , 53-X. The initiators 52 may be connected to a data storage controller (e.g., SAS module 54) via an expander 56. The SAS module 54 includes a serializer/deserializer (SERDES) 60 that communicates with a physical layer device (PHY) (link module) 62 within a port 64.

The link module 62 includes registers 65, such as a world wide name (WWN) register 66, an initiator connection tag (ICT) line register 67, and a WWN table index register 68. The registers 65 store information pertaining to a current initiator. The link module 62 may communicate with the current initiator and/or may attempt to communicate with the current initiator when the information is stored in the registers 65.

The WAN line register 66 stores a WWN for a current initiator. The ICT line register 67 stores a tag associated with a current device or module of the current initiator. For example, a first tag may be associated with a BIOS driver that is used by the current initiator during startup. A second tag may be associated with a software driver executed subsequent to the startup. The WWN table index register 68 stores a WWN table index. The WWN table index may be, for example, 1 byte in length and have a value between 0-255.

The registers 65 temporarily store WWN data from one of the initiators 52 while the link module 62 processes the WWN data. The link module 62 also services concurrent connection requests from the initiators 52 using an interrupt service routine (ISR) module 69.

The port 64 includes a control module 70, such as a microcontroller, external to the link module 62 that includes a program code memory 71. The program code memory 71 includes buffers 72-1, 72-2, . . . , 72-N (collectively buffers 72). The control module 70 stores WWN table data in selected ones of the buffers 72. The control module 70 may include, for example, a 32-bit access interface to read from and write to selected addresses of the buffers 72.

Figure 7:
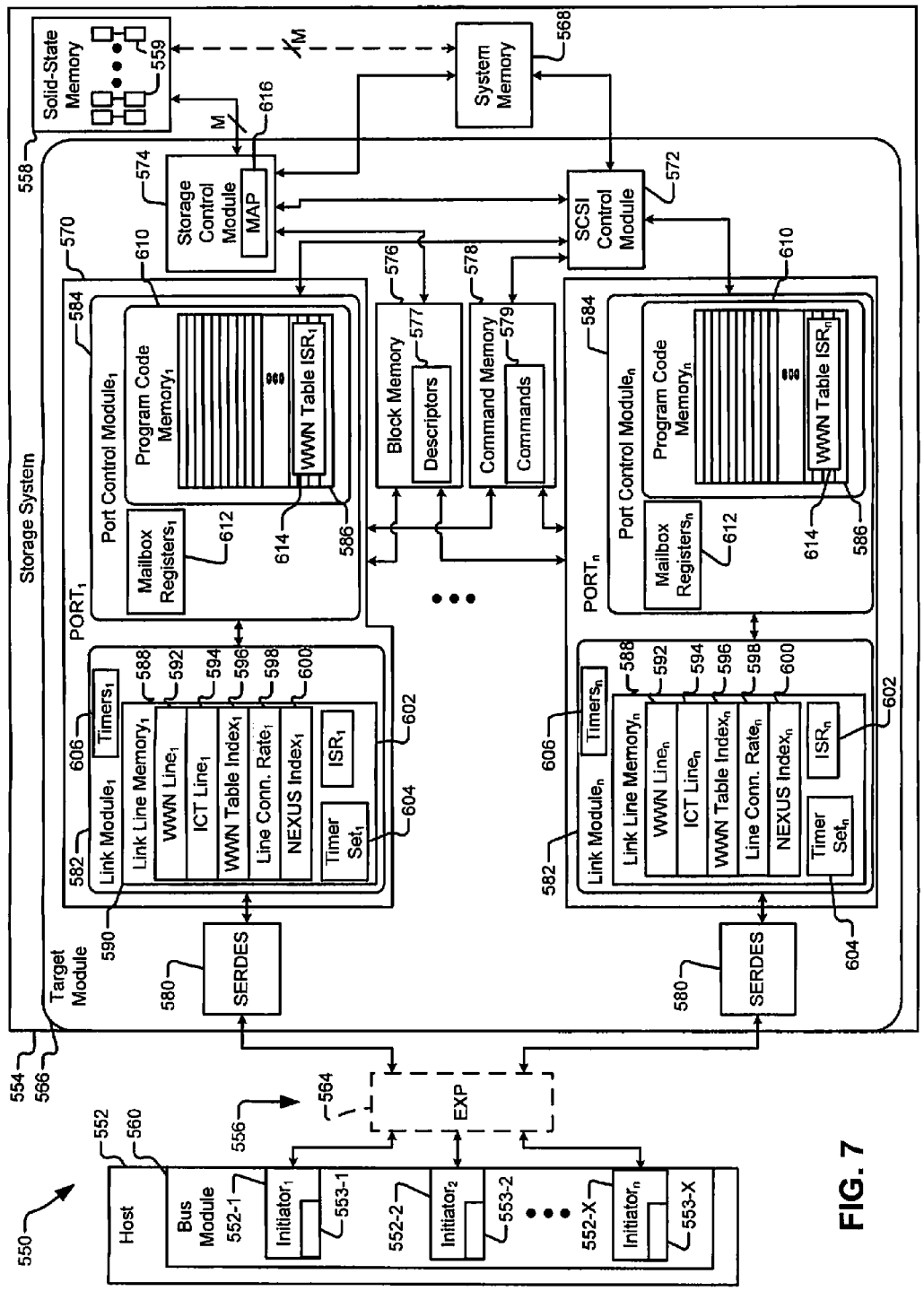
FIG. 7 is a functional block diagram of another network system in accordance with the present disclosure.

The control module 70 may be selectively controllable via a SCSI control module, as shown in FIG. 7. The SCSI control module may set length (or size) of the WWN table 73 via the control module 70. The control module 70 may allocate a number of buffers 72 to store the WWN table 73 based on a WWN table set signal from the SCSI control module.

A portion of the buffers 72 may be allocated for storing WWN table entries. A WWN table entry may refer to an array of fields in a WWN table. An example array is shown in FIG. 8. Other ones of the buffers 72 may be allocated to store WWN table management interrupt service routines (ISRs) (e.g., a WWN table management ISR 80), which are executed by the control module 70. The ISR module 69 may set an interrupt that triggers a WWN table management ISR 80 to store and/or retrieve source and/or destination WWN addresses.

The interrupt from the ISR module 69 (and/or from the link module 62) may be a WWN-to-index interrupt (received from the link module 62) and/or an index-to-WWN interrupt (received from the SCSI control module). The interrupt has an associated service command (sometimes referred to as interrupt request). The service command may be stored in a command memory, as shown in FIG. 7.

If WWN information of an open address frame from an initiator does not match the WWN information in the link registers 65, the link module 62 triggers a WWN-to-index interrupt. The WWN information is added to an assigned one of the buffers 72 (e.g., to the buffer 72-1) based on the WWN-to-index interrupt. The number of WWN table entries and/or fields that can be stored in the buffer 72-1 may be selectively defined. The control module 70 may assign a WWN table index when servicing a command associated with a WWN table entry. The control module 70 may then clear the WWN-to-index interrupt to indicate to the link module 62 that the interrupt has been serviced. A WWN index value of 0 may indicate that the WWN table 73 is full and/or that the WWN line register 66, ICT line register 67 and WWN table index register 68 are not valid.

The link module 62 automatically accepts an initiator open address frame without interrupting the control module 70 when a WWN table index in the WWN table index register 68 is not 0 (e.g., when previously set to a valid WWN Table Index value) and the current WWN Line 66, ICT line register 67 match the initiator's open address frame information.

If the WWN table 73 is full, the control module 70 may allocate additional storage for the WWN table 73. For example, the control module 70 may utilize buffer resources in system memory 81. The system memory 81 may be external to the SAS module 54. The number of WWN table entries that can be managed may be selectively defined by the SCSI control module.

The control module 70 may respond to an index-to-WWN interrupt by using the WWN table index register 68 to obtain WWN information of an initiator from the WWN table 73. The WWN information may then be stored in the registers 67 and 68 and used by the link module 62 to communicate with the initiator. The control module 70 may assign a WWN table index for each initiator or unique combination of initiator values of the WWN line register 66 and/or the ICT line register 67. The WWN table indices may be included in WWN table entries and stored in respective ones of the buffers 72.

Figure 4A:
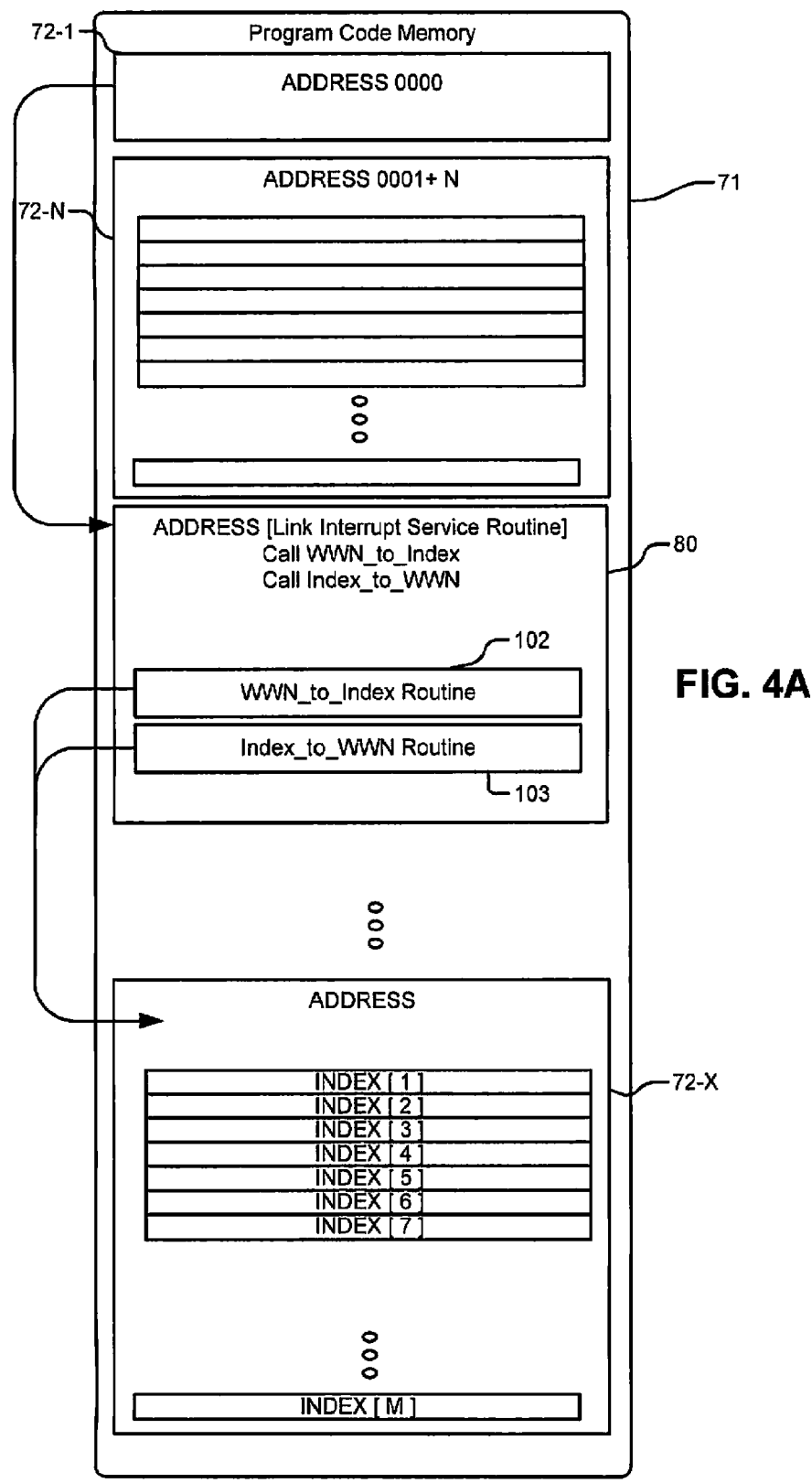
FIG. 4A is a block diagram of a portion of program code memory of a port control module in accordance with the present disclosure.

Referring also to FIG. 4A, a portion of the program code memory 71 of the control module 70 is shown. The program code memory 71 invokes a WWN-to-index routine 102 when a WWN-to-index interrupt is received by the control module 70 from the link module 62. The WWN-to-index routine 102 is used to request access to the WWN table 73 for the WWN table index. The control module 70 searches the WWN table 73 for the WWN table index.

If the WWN table index already exists in the WWN table 73 for the values of the WWN line register 66 and the ICT line register 67, the WWN table management ISR 80 is used to set the WWN table index register 68 to the value of the WWN table index. If the WWN table index does not exist in the WWN table 73, the control module 70 via the WWN table management ISR 80: assigns a new WWN table index to the WWN table index register 68; saves the new index in the WWN table 73; saves the value of the WWN line register 66; saves the value of the ICT line register 67; and saves a SAS hash address calculated from the new WWN line register 66. The control module 70 may generate a hash index request to access the SAS hash address (or the SCSI control module may request the control module 70 to access the SAS hash address). The calculated SAS hash address value, stored in the WWN table 73 only needs to be calculated once and may be used whenever transferring information (e.g., data frame, transfer read frame, response frame) to/from a specific initiator context as a higher level of security; instead of re-using the SAS hash address embedded within a given frame to ensure the initiator context is valid.

An index-to-WWN routine 103 of the WWN table management ISR 80 is used to set the WWN table index register 68 and request a corresponding WWN to be updated in the WWN line register 66 and ICT line register 67. The control module 70 via the WWN table management ISR 80 searches the WWN table 73 to locate and update the selected WWN table index stored in the WWN table index register 68. If the selected WWN table index is not found in the WWN table 73, the control module 70 (base on the WWN table management ISR 80) may set the WWN table index register 68 to 0 to indicate to the link module 62 that the request failed.

The control module 70 via the WWN table management ISR 80 reads buffer addresses in the program code memory 71 to execute WWN table management routines. The control module 70 may set the buffer addresses. The SCSI control module may interrupt the control module 70 to change, delete and/or update information in the WWN table 73. Requests from the SCSI control module may be serviced prior to servicing other requests.

Figure 4B:
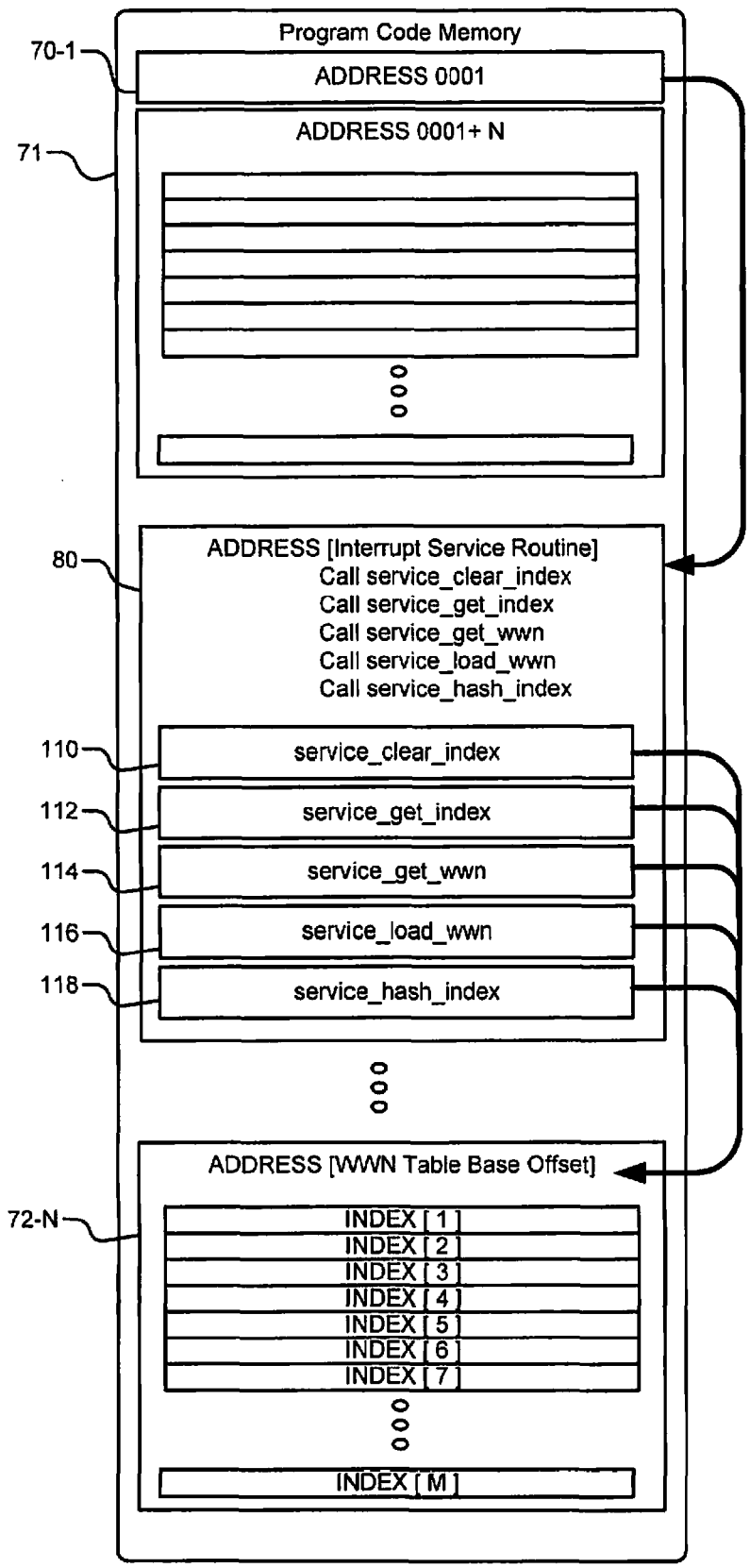
FIG. 4B is a block diagram of another portion of the program code memory of FIG. 4A in accordance with the present disclosure.

Referring now to FIG. 4B, the control module 70 may set a value in a mailbox register of the control module 70 when a request is serviced. For example, a value may be set in a mailbox register when a SCSI control module request is serviced. The SCSI control module request may be serviced according to a WWN table management routine. Example mailbox registers are shown in FIG. 7. The SCSI control module may generate various interrupt requests, such as a "service clear index" request, a "service get index" request, a "service get WWN" request", a "service load WWN" request, and a "service hash index" request. Routines 110, 112, 114, 116, 118 corresponding to each of the interrupts may be stored in the program code memory 71. The mailbox registers may be used to store information used and/or transferred between the control module 70 and the SCSI control module to service the requests. The control module 70 may allocate any number of mailbox registers to satisfy the requests.

During the service clear index routine 110, the control module 70 via the WWN table management ISR 80 reads a mailbox register with a selected WWN table index and clears a valid bit in the corresponding WWN table index field of the WWN table 73. During the service get index routine 112, the control module 70 reads mailbox registers with the selected WWN and executes the WWN-to-index routine 102 to set a mailbox to a WWN table index value that matches the given WWN and ICT values. A value of 0 is returned if no match is found.

During the service get WWN routine 114, the control module 70 reads a set of mailbox registers with the selected WWN table index and executes the index-to-WWN routine 103. During the service load WWN routine 116, the control module 70 reads mailbox registers with a selected WWN table index and updates a corresponding WWN table index in the WWN table 73. This may include updating one of the WWN table indices INDEX[1], INDEX[2], . . . , INDEX[M] with the WWN table index.

During the service hash index, the control module 70: reads a set of mailbox routines with a selected WWN table index; accesses a saved SAS hash address; and writes the address back to the mailbox registers. The WWN table management ISR 80 is used to clear a control module interrupt when the routines 110-118 are completed.

The present disclosure simplifies management of WWN information by indexing. A WWN may be 8 hex bytes in length and an ICT may be 2 hex bytes in length. Additional information specific to each initiator may also be stored. The SCSI control module may manage an indexed WWN table of WWN information and may allow a transfer request to an initiator WWN using an indexed value (e.g., a WWN table index). The indexed value may be 1 hex byte in length, which allows up to 255 initiators to be managed. An index value of 0 may indicate that current WWN information in the link module 62 is not valid.

Figure 5A:
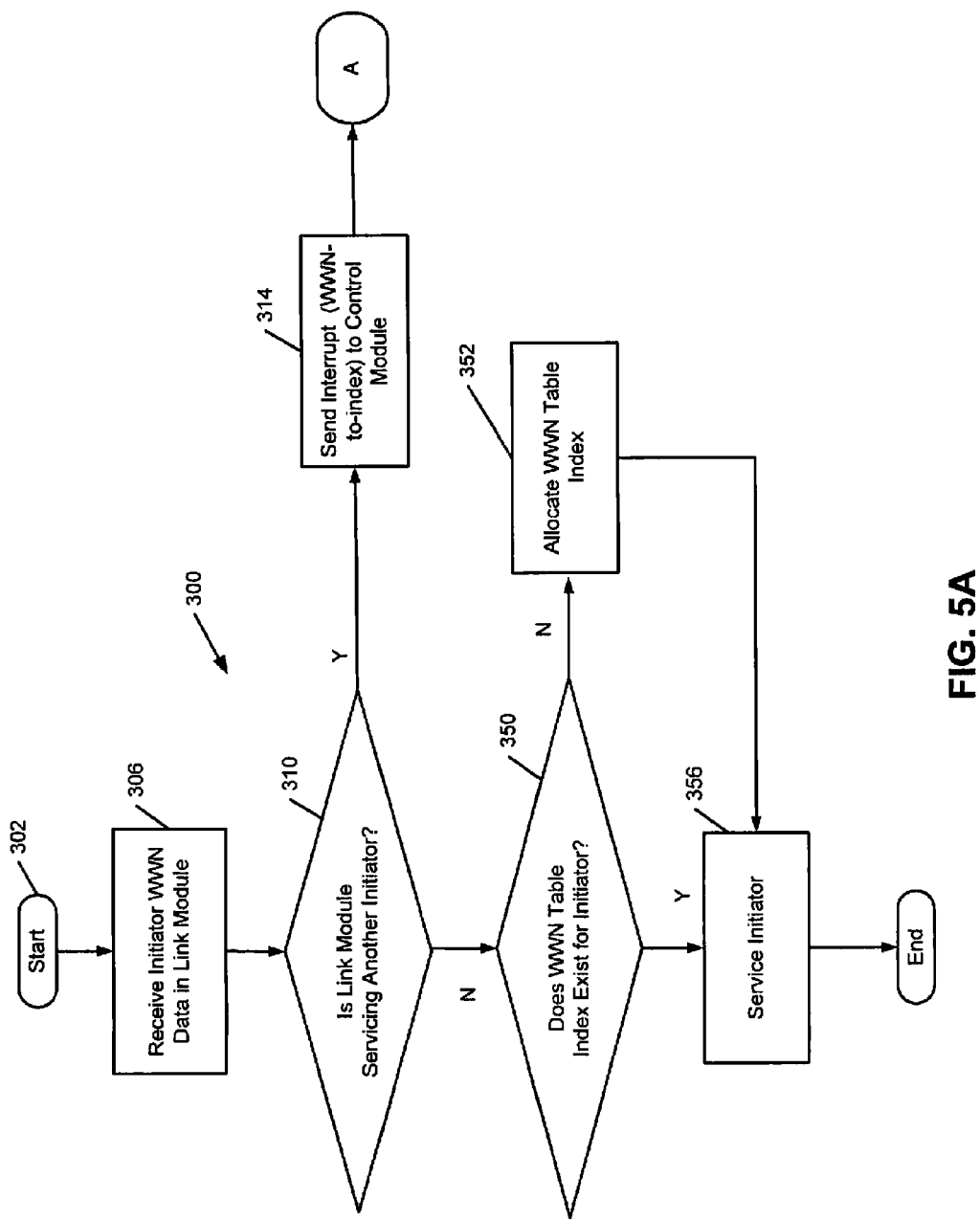
FIGS. 5A and 5B illustrate a method for storing world wide name ("WWN") information in accordance with the present disclosure.
Figure 5B:
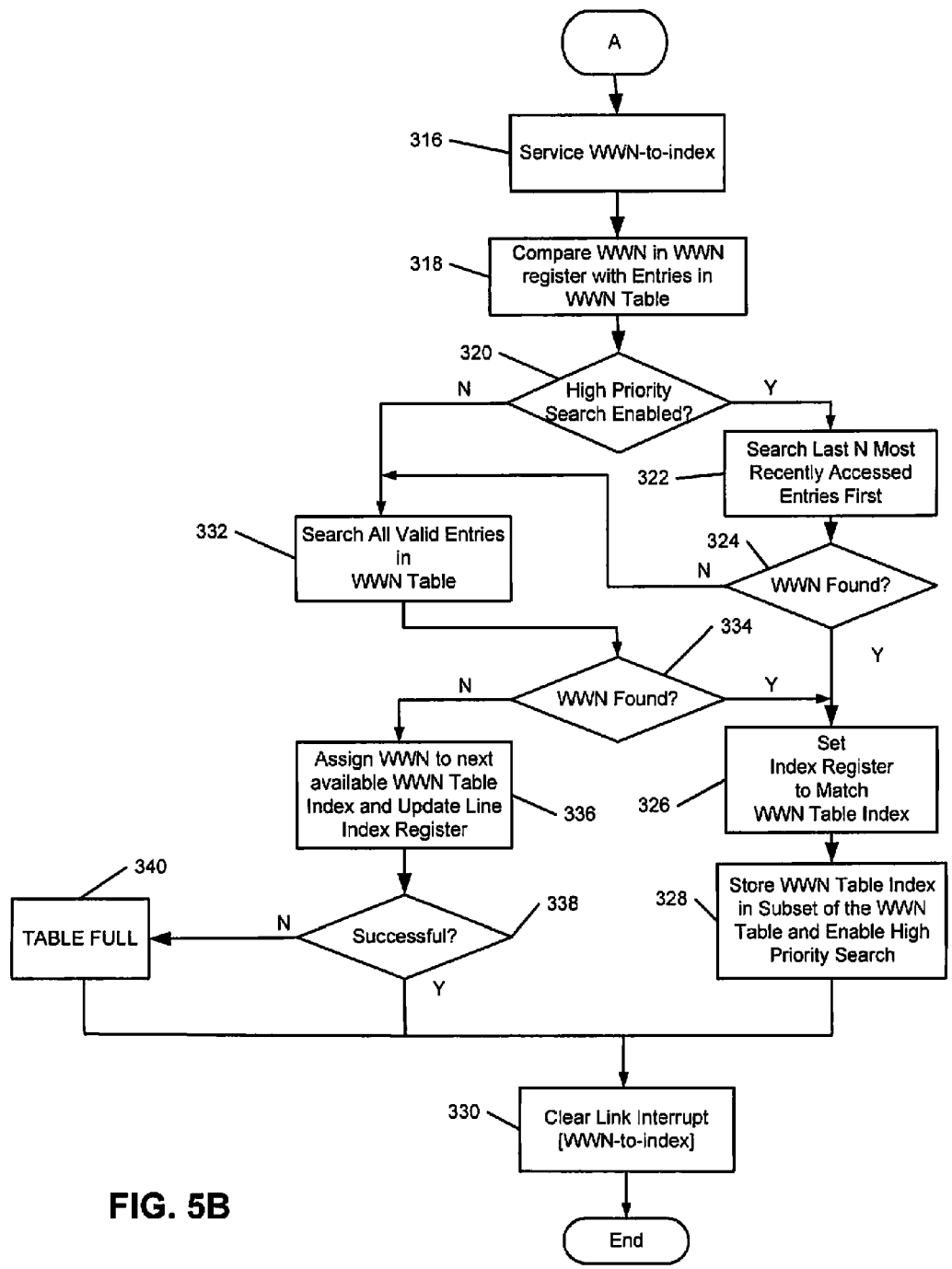

Referring now also to FIGS. 5A and 5B, a method 300 for managing a WWN table is illustrated. The method 300 may start at 302. At 306, the link module 62 receives WWN data from a first initiator. At 310, if the link module 62 is servicing a second initiator, the link module 62 sends a link interrupt to the control module 70 in task 314. At 316, the link interrupt activates a control module buffer routine. At 318, value of the WWN table index register 68 is compared with corresponding entries in the WWN table 73.

At 320, if a high priority WWN table search is enabled, most recently accessed entries of the WWN table 73 may be searched in task 322. The most recently accessed entries are searched to find a WWN table index of a second initiator. The most recently accessed entries may be stored as a subset in the program code memory 71 and searched prior to searching other areas of WWN table 73 and/or the program code memory 71.

At 324, if a WWN table index is found, the WWN table index register 68 is set to match the WWN table index in task 326. At 328 the WWN table index may be stored in a high priority subset of the WWN table 73. The high priority subset (high priority table) may be searched prior to searching other areas of the WWN table 73 during subsequent requests. A high priority search may be enabled during task 324. At 330, the link interrupt is cleared.

If results of tasks 320 and 324 are false (i.e. a high priority WWN table search is not enabled and a WWN table index is not found), all valid entries in the WWN table 73 are searched in task 332. At 334, if a WWN table index is found, task 326 is performed. If a result of task 334 is false (i.e. a WWN table index is not found), a WWN table index is assigned to the next available WWN table index value and the WWN table index register 68 is updated in task 336. At 338, if task 336 is unsuccessful, the WWN table 73 is full and the WWN table index stored in the WWN table index register 68 is set to 0 in task 340. If task 336 is unsuccessful, control implements task 330.

At 350, the link module 62 or the control module 70 determines whether a WWN table entry exists for the initiator. If a result of task 310 is false, task 350 is performed. If a result of task 350 is false, an entry is allocated in the control module 70 in task 352. If a result of task 350 is true, the initiator is serviced in task 356.

Figure 6B:
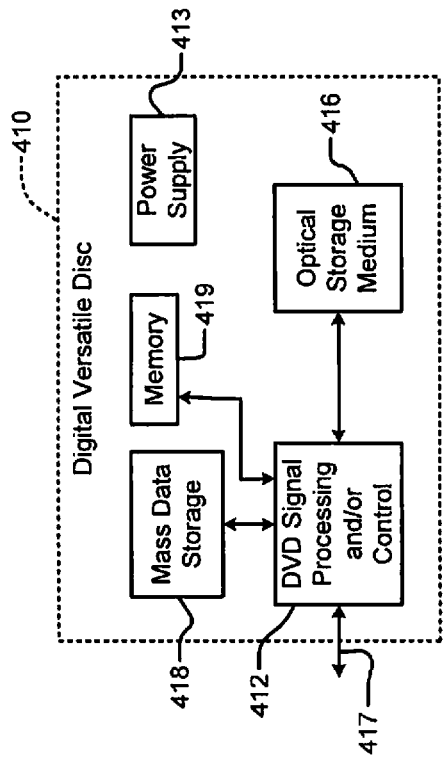
FIG. 6B is a functional block diagram of a digital versatile disk.
Figure 6A:
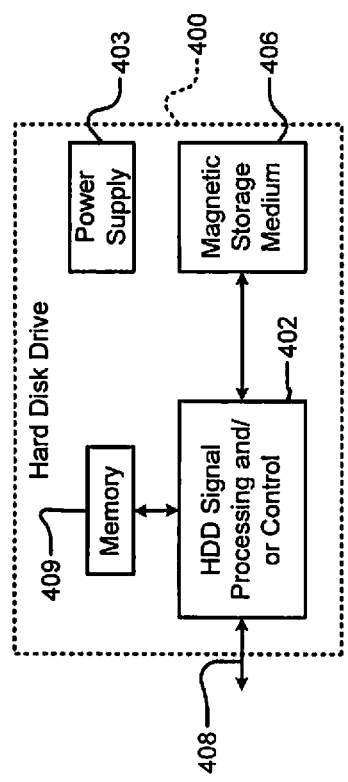
FIG. 6A is a functional block diagram of a hard disk drive.
Figure 6C:
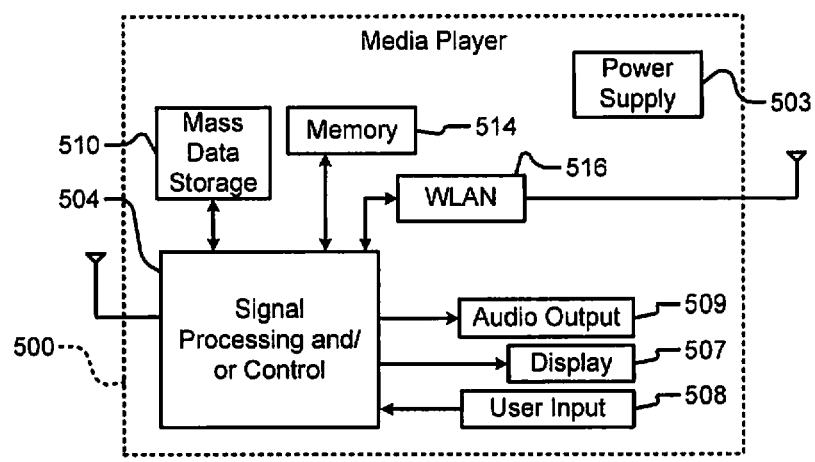
FIG. 6C is a functional block diagram of a media player.

Referring now to FIGS. 6A-6C, various exemplary implementations for the data storage controllers and storage systems disclosed herein are shown. Referring now to FIG. 6A, a data storage controller and/or a storage system may be implemented as a hard disk drive (HDD) 400. The data storage controller may be implemented as a signal processing and control module 402. The HDD 400 may include power supply 403. In some implementations, the signal processing and/or control module 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 6B, the data storage controllers and storage systems disclosed herein may be implemented in a digital versatile disc (DVD) drive 410. A data storage controller may be implemented as a signal processing and/or control module 412. The DVD drive 410 may include a power supply 413. The signal processing and/or control module 412 and/or other circuits (not shown) in the DVD drive 410 may process data, perform coding and/or encryption, perform calculations, and/or format data that is read from and/or data written to an optical storage medium 416. In some implementations, the signal processing and/or control module 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 6A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 6C, the data storage controllers and storage systems disclosed herein may be implemented in a media player 500. A data storage controller may be implemented as a signal processing and control module 504. The media player 500 may include a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control module 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

The following disclosure describes techniques for managing SAS link connection features using a WWN table.

In FIG. 7, a network system 550 is shown. The network system 550 includes one or more hosts (one host 552 is shown) and a storage system 554. The host 552 may access data in the storage system 554 via one or more initiators$_{1-n}$ 555-1, . . . , 555-X (collectively initiators 555) and over a network 556, where X is an integer. The data may be stored in various types of non-volatile memory of the storage system 554. As an example, solid-state memory 558 with NAND devices 559 is shown. The non-volatile memory may include a tape storage device, an optical storage device, a magnetic storage device, a magneto-optical storage device, a robotic library storage device, etc. The solid-state memory may include, for example, NAND memory, flash memory, random access memory (RAM), and/or other non-volatile solid-state memory.

The host 552 may be, for example, a server, a workstation, a computer, etc. The host 552 may include a bus module 560, which may be a host bus adaptor. The host bus adaptor may include any number of the initiators 555. The initiators 555 may have respective memory modules 562-1, . . . , 562-X (collectively memory modules 562). The initiators 555 may be connected to the storage system 554 directly or via one or more expanders (one expander 564 is shown). The expanders are located in the network 556.

The storage system 554 may be a solid-state memory drive, a flash drive, a disk drive, a redundant array of independent disks (RAID) system, and/or a combination thereof. The storage system 554 includes a target module 566 (SAS interface module), the solid-state memory 558, and system memory 568. The system memory 568 is used for executing commands (or command requests) received from the initiators 555.

The target module 566 includes any number of ports$_{1-n}$ 570, a SCSI control module 572, a storage control module 574, block memory 576 and command memory 578, where n is an integer. The ports$_{1-n}$ 570 may communicate with the initiators 555 via respective SERDES devices 580. The SERDES devices 580 may be located between the ports 570 and the initiators 555 within the target module 566 or may be located within the ports$_{1-n}$ 570.

Each of the ports$_{1-n}$ 570 includes a link module 582 and a port control module 584. The link modules 582 may be PHYs and include hardware to communicate with the network 564. The port control modules 584 may be, for example, microcontrollers and be used to manage respective WWN tables 586. Each of the ports$_{1-n}$ 570 may have a dedicated WWN table and/or a single WWN table may be stored in one of the ports$_{1-n}$ 570 and shared by other ones of the ports$_{1-n}$ 570.

The link modules 582 include link line memory 588 with link line registers 590. The link line registers 590 may each include a WWN register 592, an ICT register 594, a WWN table index register 596, a connection rate register 598, and a nexus index register 560. The connection rate register 598 stores a most recent (or last) connection rate associated with a current initiator. A current initiator is an initiator that a link module is connected to and communicating with or is an initiator which the link module is attempting to establish a connection.

Information stored in the link line registers 590 is associated with the current initiator. The nexus index register 600 may be used to store the last WWN table index when a current interrupt or command being serviced is placed on hold, which allows servicing of other interrupts or commands. A WWN table index stored in the nexus index register 600 may be restored in the WWN table index register 596 when servicing of the other interrupts and/or commands is completed.

The link line memories 588 may also store respective ISRs 602, which may be used to generate WWN-to-index interrupts when commands are received from the initiators 555. A WWN-to-index interrupt may be generated when a WWN of an initiator is not stored in a WWN table and/or when a WWN of the initiator is stored in a WWN table. The WWN-to-index interrupt is used to determine a WWN table index for the initiator. The WWN table index may be stored in a WWN table or may be generated when the WWN of the initiator is not stored in a WWN table (unknown initiator and WWN).

The link line memories 588 may further store respective timer sets 604 generated by timers 606 in the link modules 582. The timers 606 of each of the link modules 582 may include a nexus timer (counter), an arbitration wait timer (counter), and a pathway block timer (counter), and a retry exhausted timer (counter). The timer sets 604 may include registers for storing corresponding timer values. The arbitration wait and pathway block timers may be SAS specific and may not be used for Fibre Channel applications or other storage protocols.

A nexus timer may increment when a port is unable to connect to a host and/or initiator. The nexus timers may have a first predetermined timeout value (e.g., 2 seconds (s)). The arbitration wait timers may be associated with one or more expanders. An arbitration wait timer may increment when a port is attempting to communicate with an expander and the expander is responding with an arbitration in progress signal. The arbitration in progress signal indicates that the expander is busy. The arbitration wait timers may have a second predetermined timeout value.

A pathway block timer may increment when a port is unable to establish a connection with a host and/or initiator subsequent to the host and/or initiator sending a command to the port. A retry exhausted timer may increment subsequent to placement of an interrupt and/or command on hold and/or subsequent to a context switch to an initiator associated with the interrupt and/or command. A context switch refers to when the target module 566 switches from communicating with (or attempting to communicate with), for example, a first initiator to communicating with (or attempting to communicate with) a second initiator. The target module 566 communicates with a first initiator prior to a context switch and with a second initiator subsequent to the context switch.

The pathway block timer and the retry exhausted timer may have respective predetermined timeout values. A connection may not be established and/or a command may not be serviced if one of the timers 606 exceeds a corresponding one of the predetermined timeout values.

The timers 606 and the timer sets 604 may be used to manage any number of initiators. The timers 606 store the timer sets 604 (timer values) associated with a current initiator in corresponding link line memory. The timers 606 may be updated with values for a different initiator when a context switch is performed. Use of a single set of timers and/or timer set for multiple initiators minimizes hardware and/or software associated with the timers. This use also decreases times associated with establishing and/or reattempting to establish a connection with an initiator.

When the link module 582 is in the process of establishing a connection to a specific initiator and an open address frame is received from a different initiator, the link module 582 stores the current WWN table index value into the nexus index register 600; updates the WWN line register 592, the ICT line register 594, and the line connection rate 598 register to the values stored in the initiator open address frame; and then sets the WWN-to-Index interrupt. The port control module 584 detects that the nexus index register value is non-zero (e.g., holds a valid WWN table index) and stores the associated timer set 604 context into the WWN table 586 before servicing the WWN-to-Index interrupt.

The port control module 584 stores or restores the associated timer set 604 in addition to the WWN line register 592, the ICT line register 594, the line connection rate register 598 and the WWN table index registers 596 when servicing the WWN-to-Index or Index-to-WWN interrupts.

The port control modules 584 may each include program code memory 610 and mailbox registers 612. The program code memory 610 may be used to store program codes, the WWN tables 586 and/or WWN table ISRs (referred to as ISRs 614). The mailbox registers 612 may be used to store data or control information used and/or transferred when executing interrupts generated by the SCSI control module 572.

The SCSI control module 572: monitors states of the ports$_{1-n}$ 570; states of the WWN tables 586; controls timing and servicing order of commands received from the initiators; and manages data flow between the ports$_{1-n}$ 570 and the solid-state memory 558.

The storage control module 574 may include a storage controller (e.g., flash controller) and tracks mapping of data stored in the solid-state memory 558 (or other incorporated non-volatile memory). The storage control module 574 may store a logical block address (LBA)-to-physical block address (PBA) map 616.

The block memory 576 may store access descriptors 577. An access descriptor may be generated when, for example, a read and/or write command is serviced. An access descriptor may be generated when data associated with a command has been read from or written to the solid-state memory 558.

The command memory 578 stores active commands (e.g., command frames, SAS storage protocol (SSP) frames, Fibre Channel (FC) frames, or SCSI command frames) and/or task management frames (collectively active frames 579) received from the initiators. A command frame is used to deliver command information that describes a command or task to be performed by the target module 566. The command frame may indicate that the target module perform: a read/write operation of block or non-block data; get/set mode sense configuration parameters; and/or get/set log sense parameters, etc.

A task management frame describes a task management function to be performed on a specific task (SCSI command) or multiple tasks in a task set. The task(s) may be managed by the SCSI control module 572. A task management function may be an abort task, an abort task set from an initiator, a clear task set for all initiators, a logical reset, etc.

As one example, the command memory 578 may perform as a first-in-first-out (FIFO) memory. As another example, the SCSI control module and/or the port control modules may dictate the order in which commands are serviced based on priority levels.

In operation, the SCSI control module 572 (and/or one of the port control modules 584) may service, for example, a read command. The SCSI control module 572 may transmit a read request to the storage control module 574, which may then access the solid-state memory 558 based on the read request and the LBA-to-PBA map 616. The data read from the solid-state memory 558 may be stored in the system memory 568 temporarily and prior to transmitting the data to an initiator. The storage control module 574 may generate an access descriptor indicating that the data has been transferred to the system memory 568.

The access descriptor is stored in the block memory 576, which may be accessed by the SCSI control module 572 and/or one of the port control modules 584. One of the port control modules 584 may access a WWN table index and/or other WWN information associated with the read data based on the access descriptor. The port control module may then program the link line registers (i.e. store the looked-up WNN information in the link line registers). A link module of the link line registers then transmits the read data to the initiator.

Referring now also to FIG. 8, an example WWN table entry (or array) with WWN information fields for an initiator is shown. The WWN table array 620 includes a byte offset column 622 and a WWN table field name column 624. The WWN table array 620 may include a WWN entry state field 626, a WWN table index field 628, ICT fields 630, WWN fields 632, a connection rate field 634, SAS hash address fields 636, arbitration wait time fields 638, nexus timer fields 640, a pathway blocked field 642, and an active command count field 644.

The WWN entry state field 626 may identify whether the WWN table array 620 is associated with a WWN-to-index interrupt and/or an index-to-WWN interrupt. Link line registers in link line memory may be setup with information in the WWN table array 620, when one of these interrupts is generated and/or received. The WWN table index 628 may include a selected 1 byte value (e.g., 0-255). The ICT fields 630 may include ICT high and low values. The WWN fields 632 may each include a byte that together store a WWN.

The connection rate field 634 stores the latest connection rate for an initiator with the WWN. If a link module (link hardware) triggers a WWN-to-index interrupt based on an initiator request signal (open address frame), and a specified connection rate of the initiator request signal is valid, the connection rate may be stored in the WWN table array 620. A connection rate may be valid when the connection rate is less than or equal to a physical rate of the target module 566 (or a physical rate of a link module). The connection rate may be accessed, for example, when a context switch to the initiator is performed.

If an initiator attempts to open a connection with a different connection rate than previously used, a link module (e.g., one of the link modules 582) detects this connection rate change request. The link module sets a WWN-to-index interrupt to save the new connection rate in a WWN table and/or in a connection rate register; or the link module may automatically modify the connection rate to match the requested connection rate (e.g., Enable Single or Double SAS Rate Matching) and mark all frames (e.g., command, task management, data, etc.) received during the connection with the associated connection rate and WWN table index. If another connection is required to complete the transfer request, when the frames described above are processed by the SCSI control module 572, the connection rate stored with the frame may be used to service the transfer request. The next time the port control module 584 services a WWN-to-Index or Index-to-WWN interrupt to connect to a different initiator, the connection rate will get stored/restored to/from the WWN table 586, as needed.

A link module (e.g., one of the link modules 582) may set an index-to-WWN interrupt when a port control module submits a transmit request associated with a context change and/or a different connection rate. If the transmit request received by the link module includes a WWN table index that does not match a value in a WWN table index register for a current initiator, the index-to-WWN interrupt may be generated. The index-to-WWN interrupt may also be generated when the new connection rate is different than a current connection rate. The index-to-WWN interrupt may be generated such that a most recent connection rate for the current initiator is restored. The most recent connection rate may be restored using information previously stored in a WWN table for this initiator.

The SAS hash fields 636 (e.g., 24-bit SAS hash address) may store high, middle, and low hash addresses. The arbitration wait time fields 638 may store arbitration wait time high and low values for an arbitration wait timer. The nexus timer fields 640 may store nexus timer high and low values for a nexus timer. The pathway blocked field 642 stores a pathway blocked timer (counter) value. If the timer fields 638-642 are not 0 (e.g., greater than zero) for a current initiator (current context), values of the timer fields 638-642 may be removed from link memory and stored in a WWN table. If a current context has timer fields that are non-zero, the values of the timer fields may be restored in registers of the link memory to retry opening a connection.

Manage Active Initiators and a Target Module Task Set

Referring again to FIG. 7, the port control modules 584 and/or the SCSI control module 572 may store a target module task set. The target module task set may include command frames and/or task management frames that are to be serviced. For example, the target module task set may include a list of the command frames and task management frames stored in the command memory 578.

The port control modules 584 store active frames for the initiators in the command memory 578. The port control modules 584 and/or SCSI control module 572 may not accept additional interrupts and/or commands when the target module task set and/or the command memory 578 is full. To balance service to the initiators (e.g., storage access fairness to all initiators), the port control modules 584 (and/or the SCSI control module 572) may not transmit a task set full signal (e.g., status response frame with a response code indicating the task set is full) when an initiator does not have an active command in the task module task set (and/or in the command memory 578); and wait until space is available in the command memory 578; otherwise, the port control modules 584 (and/or the SCSI control module 572) immediately transmit a task set full signal. This allows each of the initiators to have at least one active command in the target module task set (and/or in the command memory 578).

The port control modules 584 may store the number of active commands for each of the initiators in respective active command fields (e.g., the active command count field 644 of FIG. 8) of the WWN table 586. The active command fields may indicate the number of active commands at any moment in time. WWN information (or a WWN table array) associated with an initiator may be removed from a WWN table when an active command field for that initiator is 0 for a predetermined period of time. An initiator is considered in an idle state when the corresponding active command field is 0. A WWN table index for a first initiator that is in an idle state may be removed (e.g., invalidated and available for re-use) to allow addition of a second initiator to be stored using the next available WWN table index. This assures that non-idle initiators are serviced.

If (i) an initiator has an active command in the target module task set (active command field is greater than or equal to 1) and (ii) the target module task set is full, a port control module may generate a task set full signal. The task set full signal may be sent to a link module, which may then forward the task set full signal to the initiator. If the initiator does not have an active command in the target module task set, the target module 566 may wait for a "command frame slot" to become available to store at least one command for the initiator in the target module task set.

An active command count field for a current initiator may be accessed in a WWN table when an open address frame is accepted from the initiator by the target module 566 and/or one of the port control modules 584. The active command count field is incremented for each active frame received by the initiator. As frames are serviced and corresponding status responses are sent to complete each request, the active command count field is decremented. The state of the active command count field is stored in the WWN table whenever an initiator context switch is performed. The active command count field may be accessed and/or restored when another context switch is performed to reestablish a connection with the initiator. Active command count methods are described with respect to FIGS. 12 and 13 below.

Using active command count fields and allowing each initiator to have at least one active command in a task set provides "fairness" and a "balance" among initiators. This provided balance assures that an initiator is able to access the target module 566 in high loaded traffic storage environments.

Rate Matching

The target module 566, the link modules 582, and/or the port control modules may communicate with initiators based on respective connection rate fields. The modules 566, 582, 584 may add dummy words (fill words) to a data signal transmitted from the target module 566 to an initiator. The dummy words may be added based on a connection rate of the initiator and a maximum rate of the target module 566. Rate matching may be performed when the connection rate is different than the maximum rate. For example, a maximum rate of the target module 566 (or physical link rate) may be 6 gigabits per second (Gb/s) and example connection rates may be 1.5 or 3 Gb/s. The dummy words may be removed from a data signal by the expander 564 (which were previously added by the link module 582) prior to the data signal being transmitted from the expander 564 to the initiator. The expander 564 may add dummy words to a data signal transmitted from the initiator and prior to being received by the target module 566. The link module 582 removes the dummy words from the data signal when received.

If connection rate of an open address frame (initiator connection rate) is less than a physical link rate, the link module enables rate matching prior to an open accept primitive (or signal) is sent from the target module 566 to an initiator. If rate matching is enabled, a link module may set a WWN-to-Index interrupt or an Index-to-WWN interrupt depending upon whether an open address frame or a transfer request is received from the initiator or the SCSI control module 572. A transfer request may (i) refer to a request generated by the SCSI control module 572 and (ii) be associated with an active frame stored in the command memory 578.

The link modules 582 and/or the port control module 584 may compare a last connection rate of a WWN table index to the physical link rate. If the last connection rate matches the physical link rate, rate matching may be disabled.

If more than one request is submitted to the same initiator (host), state of rate matching may be the same for all of the requests. The state of rate matching may remain the same until a new open address or transfer request frame is received by the target module 566.

If one or more requests are submitted to multiple hosts, rate matching may be controlled by an assistant feature of the link modules 582. Rate matching control may be provided when a WWN-to-index or index-to-WWN interrupt is generated.

If a requested connection rate in an open address frame is greater than the physical link rate, an open reject primitive (e.g., OPEN REJECT (CONNECTION RATE NOT SUPPORTED)) is sent from a link module to an initiator. This indicates to the initiator that the connection rate is not supported.

If the link modules 582 and/or the port control modules 584 receive a WWN-to-index interrupt based on an initiator request signal, the link modules 582 and/or the port control modules 584 determine whether a WWN of the initiator exists in a WWN table. If the WWN exists in the WWN table, information in link line registers is updated based on information in the WWN table and/or information, provided in the initiator request signal. The updated information may include a latest connection rate of the initiator. A WWN table index may be stored in a WWN table index register. If the WWN does not exist in the WWN table, a WWN table index may be created, assigned and stored for the initiator in the index register and/or in the WWN table. Regardless of whether the WWN of the initiator is stored in the WWN table, rate matching may be enabled.

If the link modules 582 and/or the port control modules 584 receive an index-to-WWN interrupt, link line registers are updated with WWN information stored in the WWN table for an initiator. If a last connection rate for the initiator is less than the physical link rate of the target module 566, rate matching is enabled. If the last connect rate matches the physical link rate, rate matching is disabled.

Accidental Lock Control

The port control modules 584 and/or the SCSI control module 572 may prioritize contexts and/or WWN information associated with certain initiators. The port control modules 584 and/or the SCSI control module 572 manage certain WNN table index assignments by using a "lock" control bit to prevent a WWN table index from being re-assigned. The ability to lock a WWN table index when a WWN table is full enables high priority to select initiators. The high priority may be provided, for example, to the last or most often communicated with S initiators, where S is an integer.

Locking certain WWN table indices minimizes the number of security checks and pre-checks of initiators by a port and/or by the SCSI control module 572. Encryption keys and other security information may be stored with the WWN table index and in the WWN table. The security checks may be performed once when a WWN table index is assigned. The security checks may not be performed again until a hard or power ON reset of the storage system 554. An initiator or host may be pre-checked once and security keys may not be checked.

Narrow and Wide Port

The ports$_{1-n}$ 570 may operate in a narrow port mode or in a wide port mode. During the narrow port mode, each initiator communicates with one of the ports$_{1-n}$ 570. During the wide port mode, an initiator may communicate with two or more of the ports$_{1-n}$ 570. The timers 606 may be applied to both the narrow and wide port modes.

The wide port mode may include servicing of an initiator request via two or more ports. For example, a first PHY (link module) may establish a first connection with an initiator when a second PHY (link module) establishes a second connection with the initiator. The first and second connections may be to the same SAS address, as both connections are to the same initiator. The first PHY may communicate with the initiator while the second PHY communicates with the initiator.

During the wide port mode, the first port may receive an active command from an initiator. Connections between a first port and the initiator and between a second port and the initiator may be established based on the active command. The active command may be received from any one of the ports.

The methods described herein provide WWN table management flexibility. The contents of the WWN tables described herein may be user defined via user inputs. Connection related attributes and timer related attributes of the WWN tables may each be user defined. This allows easy adaptation to changes in storage protocol standards.

Figure 9A:
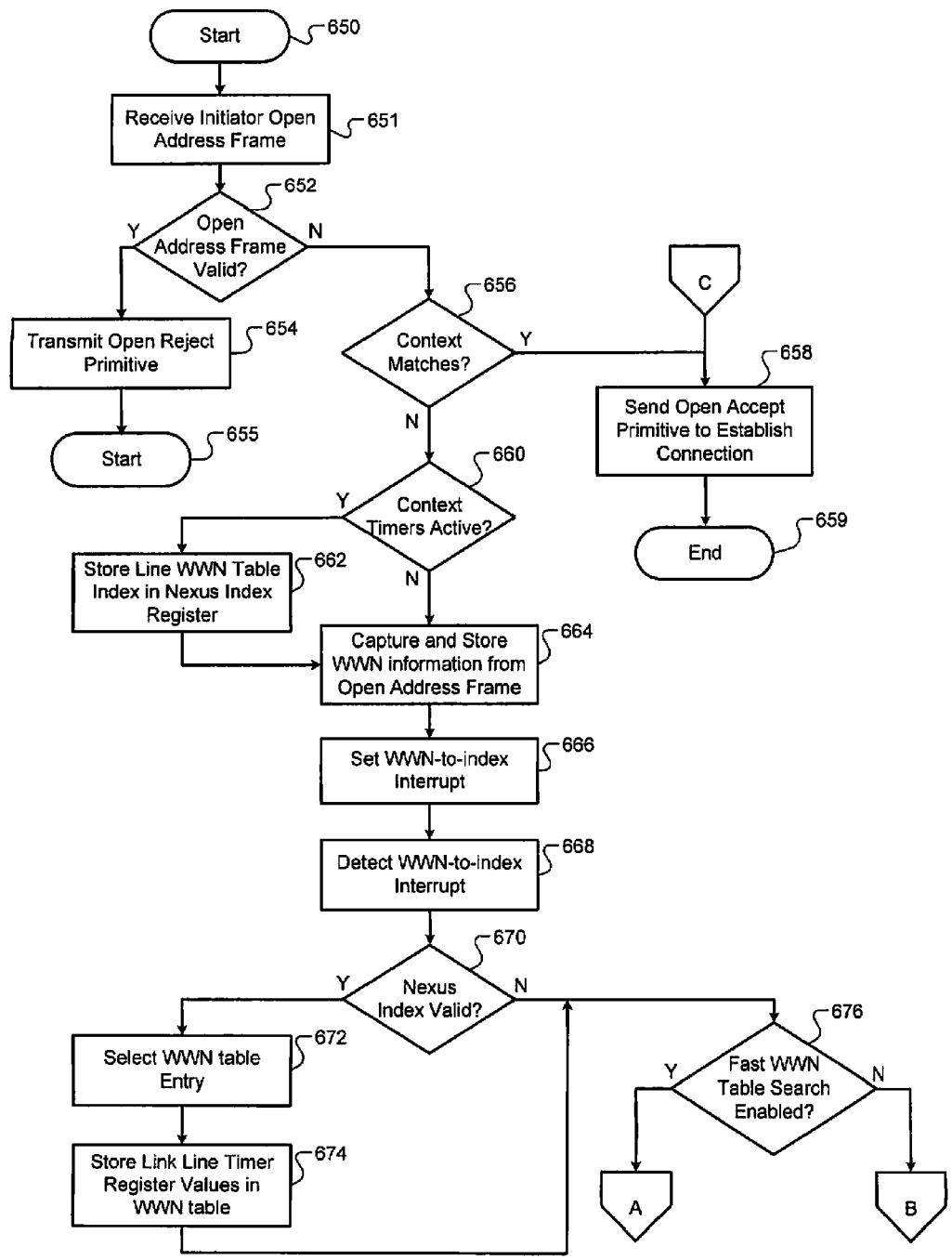
FIGS. 9A and 9B illustrate a method of managing a connection rate for an initiator open request in accordance with the present disclosure.
Figure 9B:
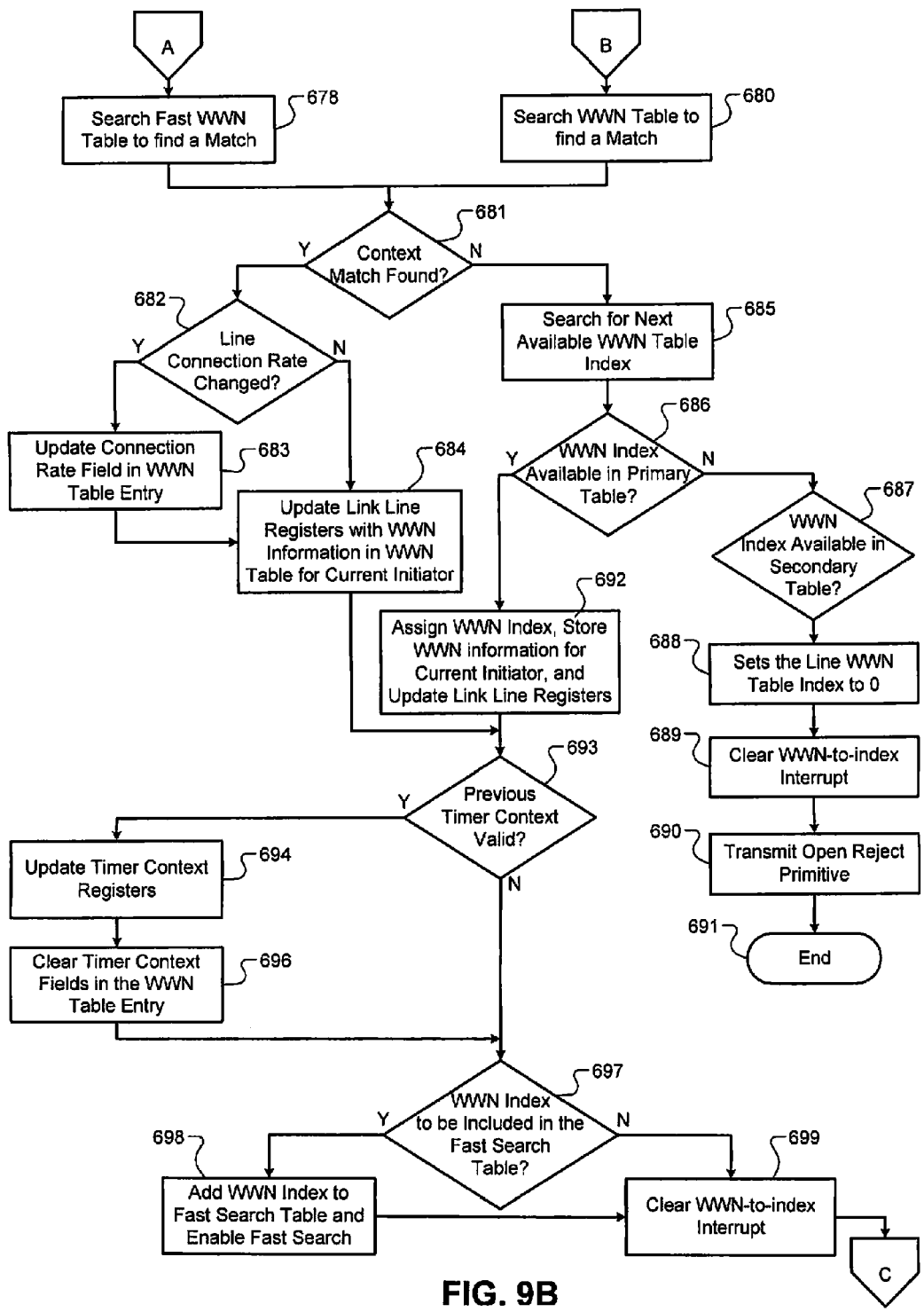

In FIGS. 9A and 9B, a method of managing a connection rate for an initiator open request is shown. Although the following tasks are primarily described with respect to the implementations of FIGS. 7 and 8, the tasks may be easily modified to apply to other implementations of the present disclosure. The tasks may be iteratively performed. The method of FIGS. 9A and 9B is initiated when the target module 566 of FIG. 7 is not connected to an initiator (i.e. no communication connection established with the initiator).

The method of FIGS. 9A and 9B may be performed when (i) an initiator (first or current initiator) is attempting to establish a connection with the target module and/or (ii) the target module is attempting to establish a connection with the initiator (first initiator) or with some other initiator (second or previous initiator). The method may begin at 650. At 651, the target module receives an open address frame (open request signal) from an initiator (current initiator) at a port (e.g., one of ports$_{1-n}$ 570).

At 652, a link module (physical layer) may check if the open address frame is valid. The open address frame may be valid when in, for example, a correct format. The link module may check the number of fields, the type of fields and/or the state of the fields of the open address frame when determining whether the open address frame is in the correct format. The link module may proceed to task 654 when the open address frame is invalid. The link module may proceed to task 656 when the open address frame is valid.

At 654, the link module transmits an open reject primitive (open reject signal) to the current initiator. The method may end at 655 subsequent to task 654.

At 656, the link module checks if a context associated with the current initiator matches a state of link line registers of the port. Put another way, the link module checks if WWN information in the open address frame for the current initiator matches WWN information stored in the link line registers. This may include checking a WWN, an ICT, a connection rate, etc. If the context matches, task 658 is performed. If the context does not match, task 660 is performed.

At 658, the link module transmits an open accept primitive (open accept signal) to establish a connection with the current initiator. The method may end at 659 subsequent to task 658.

At 660, the link module determines if timers of the link module (context timers) (e.g., timers 606 of the port) are active. The timers are active when timer values for a previous initiator are not equal to 0. The previous initiator may refer to an initiator that the target module was attempting to establish a connection with prior to receiving the open address frame. The previous initiator may be the current initiator or may be some other initiator. If one or more of the timers are active task 662 is performed, otherwise task 664 is performed.

At 662, the link module stores a WWN table index for a previous initiator in a nexus index register. The WWN table index may be used to store timer values in subsequent tasks and/or may be recalled to establish a connection with the previous initiator.

At 664, the link module captures and stores WWN information from the open address frame into the link line registers. The WWN information may include a WWN, ICT and connection rate of the current initiator. Previous link line non-timer register settings are overwritten. Although the link line registers hold WWN information for the current initiator at this point, timer registers may hold timer values for the previous initiator; if the link module was in the process of trying to establish a connection. The timer registers may include nexus, arbitration wait, and pathway block timer registers.

At 666, the link module triggers a WWN-to-index interrupt. The WWN-to-index interrupt is generated to invoke an ISR of the port control module of the port. At 668, the port control module (or port layer) associated with the link module detects the WWN-to-index interrupt via an ISR (e.g., one of the WWN table ISRs 614).

At 670, the port control module via the ISR determines whether the nexus index (value stored in the nexus index register) is valid. The nexus index is valid when the nexus index is greater than 0. The port control module proceeds to task 672 when the nexus index is valid, otherwise to task 676.

At 672, the port control module via the ISR selects a WWN table entry (WWN table array) for the previous initiator. At 674, the port control module via the ISR captures the timer values of the link module and updates corresponding timer value fields for the previous initiator in a WWN table of the port.

At 676, the port control module via the ISR determines whether a high priority (fast) WWN table search is enabled. A high priority WWN table search may be enabled when the WWN of the current initiator matches a WWN in a list of high priority WWNs (high priority subset of the WWN table or high priority table) stored in the program code memory. A predetermined portion of the WWN table dedicated to high priority entries may be searched when performing the fast WWN table search. Other portions of the WWN table may not be searched when performing the fast WWN table search. The high priority table may have, for example, a list of most recently accessed and/or most often accessed entries. When a high priority WWN table search is enabled task 678 is performed, otherwise task 680 is performed.

At 678, the port control module via the ISR searches the high priority table to find a WWN that matches the WWN of the current initiator. The port control module may also search the high priority table for an entry that matches both the WWN and the ICT of the current initiator.

At 680, the port control module via the ISR searches the WWN table to find an entry that matches the WWN and the ICT of the current initiator. The whole WWN table may be searched.

At 681, the port control module via the ISR determines whether a context match is found. If a context match has been found, task 682 is performed, otherwise task 685 is performed.

At 682, the port control module via the ISR determines whether the connection rate for the current initiator has changed since a previous (or last) connection with the current initiator. If the connection rate provided in the open address frame is different than a connection rate stored in the WWN table, task 683 is performed, otherwise task 684 is performed.

At 683, the port control module via the ISR updates the connection rate field in the WWN table for the current initiator. At 684, the port control module via the ISR updates the link line registers with WWN information in the WWN table for the current initiator. The WWN information may include the WWN table index, the ICT and the connection rate.

At 685, the port control module via the ISR searches the WWN table (primary table) to find a next available WWN table index. At 686, the port control module via the ISR determines whether a WWN index is available. Task 692 is performed when a WWN table index is available, otherwise task 687 is performed.

At 687, the port control module via the ISR determines whether a WWN table index is available from a secondary WWN table and/or a secondary memory (memory other than the program code memory). The port control module may temporarily store values of the link line registers in the secondary memory. Task 692 is performed when a WWN table index is available, otherwise task 688 is performed. At 688, the port control module via the ISR may set the WWN table index in the link module to 0. This invalidates the values of the link line registers for the current initiator.

At 689, the port control module via the ISR clears the WWN-to-index interrupt. At 690, the link module transmits an open reject primitive (open reject signal) in response to the clearing of the WWN-to-index interrupt. The open reject signal may indicate to the current initiator to retry establishing a connection with the target module (i.e. send another open address frame). The method may end at 691.

As an alternative, the port control module may initiate a pause state when a WWN table index is not available and wait until a WWN table index is available. The port control module may proceed to task 692 when a WWN table index is available instead of performing tasks 688-691.

At 692, the port control module via the ISR assigns the available WWN table index to the current initiator. Link line register values (WWN information) of the current initiator are stored along with the WWN table index as a WWN table entry in the WWN table. The WWN table index in the link line memory may be updated with the available WWN table index selected.

At 693, the port control module via the ISR checks if the timer values in the WWN table are valid. The timer values in the WWN table may refer to a previous timer context for the current initiator. The timer values include the nexus, arbitration wait and pathway block timer values. The timer values are valid when the timer values are not equal to 0. If one of the timer values is not equal to 0 then task 694 is performed, otherwise task 697 is performed.

At 694, the port control module via the ISR updates the timer values in the link line registers. At 696, the port control module via the ISR clears the timer values in the WWN table for the current initiator to 0. The timer values in the WWN table are cleared such that the timer values are valid during a next connection establishing process performed with the current initiator.

At 696, the port control module via the ISR determines whether the WWN table index is to be included in the high priority table. If the WWN table index is to be included in the high priority table, task 698 is performed, otherwise task 699 is performed.

At 698, the WWN table index is added to the high priority table and a fast search is enabled for the WWN and/or the WWN table index of the current initiator. This provides a high priority status for the current initiator, which decreases future connection establishing times with the current initiator.

At 699, the port control module via the ISR clears the WWN-to-index interrupt. Task 658 is performed subsequent to task 699.

Figure 10A:
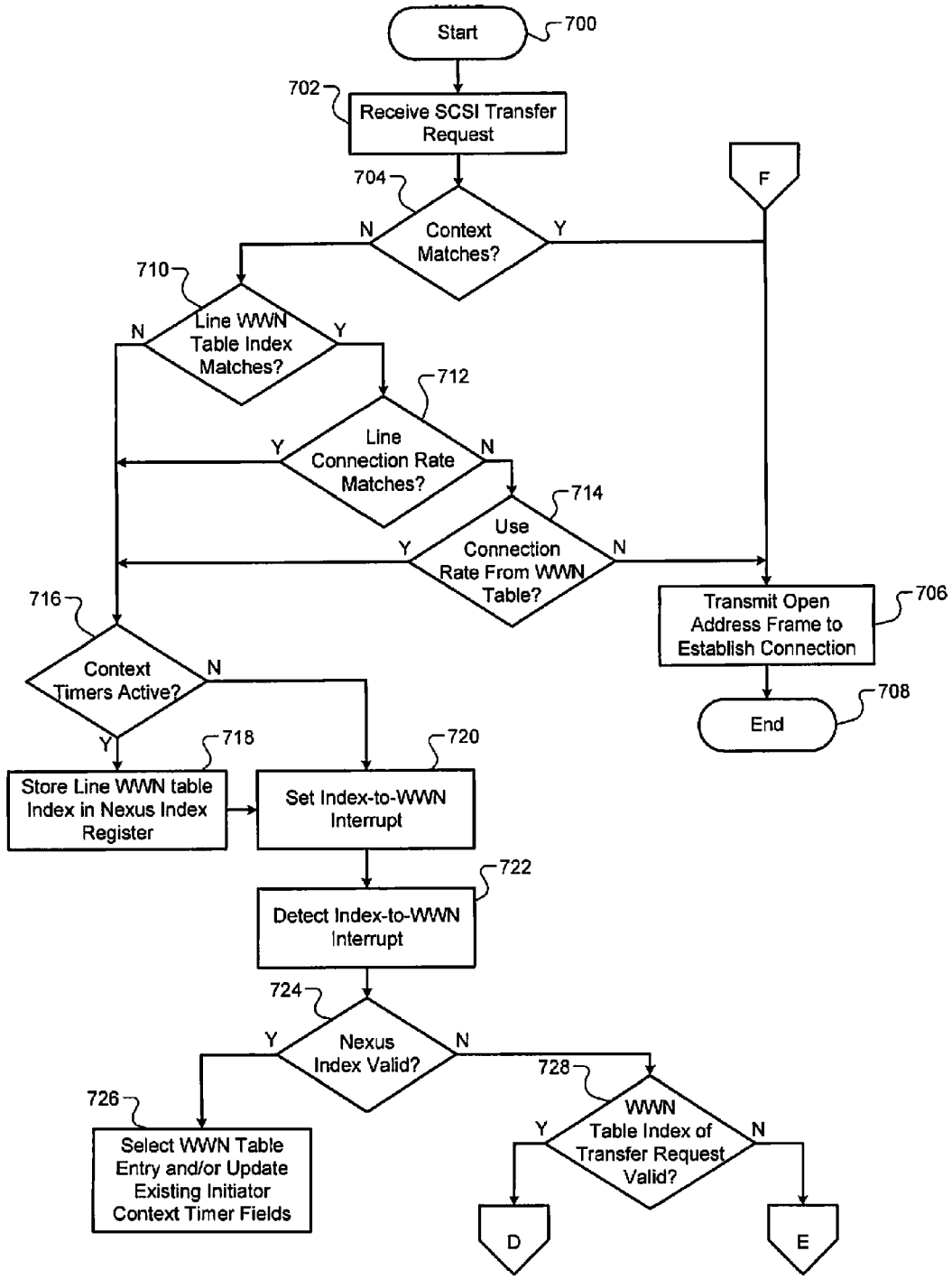
FIGS. 10A and 10B a method of managing a connection rate for a small computer systems interface module open request in accordance with the present disclosure.
Figure 10B:
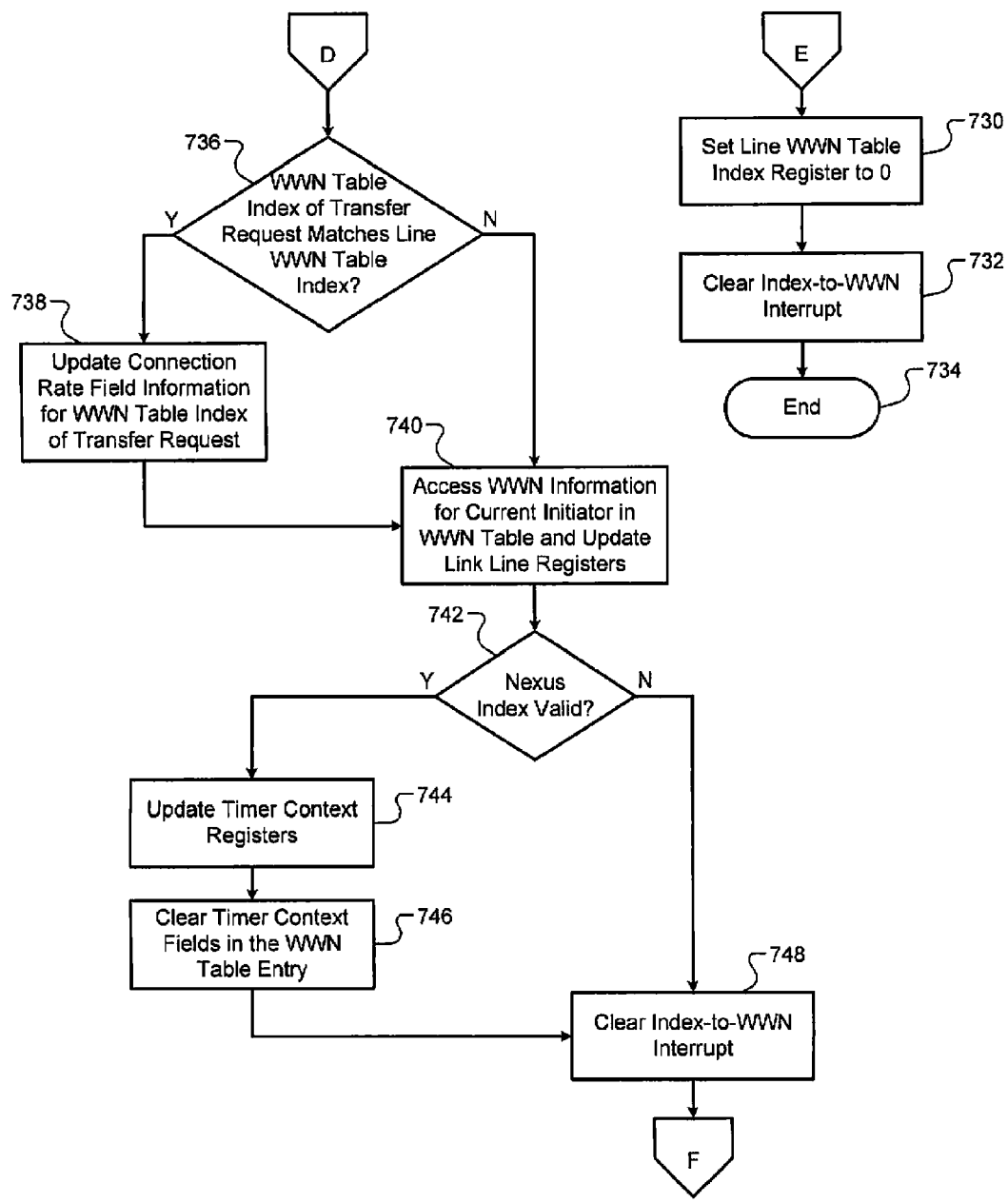

In FIGS. 10A and 10B, a method of managing a connection rate for a small computer systems interface module open request is shown. The method of FIGS. 10A and 10B is initiated when the target module 566 of FIG. 7 is not connected to an initiator. The method of FIGS. 10A and 10B may be performed when (i) the SCSI control module 572 sends a transfer request to a port to establish a connection with a current initiator and/or (ii) the port is currently attempting to establish a connection with the current initiator or with another (previous) initiator.

Although the following tasks are primarily described with respect to the implementations of FIGS. 7 and 8, the tasks may be easily modified to apply to other implementations of the present disclosure. The tasks may be iteratively performed. The method may begin at 700.

At 702, the SCSI control module 572 sends the transfer request to a link module of a port. The transfer request is a request to establish a connection with the current initiator.

At 704, the link module checks whether there is a context match for the current initiator. There is a context match when WWN information in link line memory of the link module matches WWN information provided in the transfer request. Task 706 is performed when there is a context match. Task 710 is performed when one or more register values in the link line memory, such as a WWN table index, an ICT and/or a connection rate, does not match a corresponding field in the transfer request.

At 706, the link module transmits an open address frame to establish a connection with the current initiator. The method may end at 708.

At 710, the link module determines whether the WWN table index in the link line memory (line WWN table index) matches the WWN table index in the transfer request for the current initiator. Task 712 is performed when the WWN table index in the link line memory matches, otherwise task 716 is performed.

At 712, the link module determines whether the connection rate in the link line memory (line connection rate) matches a connection rate in the transfer request for the current initiator. Task 714 is performed when the line connection rate does not match, otherwise task 716 is performed.

At 714, the link module determines whether the line connection rate or the connection rate stored in the WWN table for the current initiator should be used. Task 706 is performed when the line connection rate should be used and the connection rate in the WWN table should not be used. Task 708 is performed when the connection rate in the WWN table should be used and the line connection rate should not be used. The connection rate in the WWN table that is used is the most recently stored connection rate for the current initiator. The connection rate maybe optionally selected by the SCSI control module.

At 716, the link module determines whether context timers are active. The context timers are active when the timer values in registers of the link module are not 0. The timer values may be associated with the current initiator or a previous initiator. Task 718 is performed when the context timers are active, otherwise task 720 is performed.

At 718, the link module stores the line WWN table index in a nexus index register. At 720, the link module sets an index-to-WWN interrupt.

At 722, a port control module of the port detects the index-to-WWN interrupt via the ISR (e.g., one of the WWN table ISRs 614). At this point the link module may be in an idle state waiting for the index-to-WWN interrupt to be cleared. At 724, the port control module via the ISR determines whether the nexus index is valid. The nexus index is valid when the nexus index value is greater than 0. Task 726 is performed when the nexus index is valid, otherwise task 728 is performed.

At 726, the port control module via the ISR (i) uses the nexus index to select a WWN table entry for the previous initiator and/or (ii) updates existing initiator context timer fields for the previous initiator. The port control module captures the link module timer values and updates corresponding timer value fields for the previous initiator in the WWN table. The timer value fields include nexus, arbitration wait, and pathway block timer fields.

At 728, the port control module via the ISR determines whether the WWN table index of the transfer request is valid. The WWN table index of the transfer request is valid when it matches a WWN table index in the WWN table. Task 730 is performed when the WWN table index is invalid, otherwise task 736 is performed.

At 730, the port control module via the ISR sets the line WWN table index register to 0. The line WWN table index is invalid when it is 0. This may indicate that the transfer request is invalid. At 732, the port control module via the ISR clears the index-to-WWN interrupt. The method may end at 734.

At 736, the port control module via the ISR determines whether the line WWN table index matches the WWN table index in the transfer request. Task 738 is performed when the line WWN table index matches the WWN table index of the transfer request matches, otherwise task 740 is performed.

At 738, the port control module via the ISR updates a connection rate field in the WWN table for the WWN table index of the transfer request. The connection rate of the transfer request may be stored in the WWN table for the current initiator.

At 740, the port control module via the ISR accesses the WWN table to obtain WWN information for the current initiator and updates the link line registers. The WWN information is associated with a new context and may include the WWN table index, the WWN, the ICT and the connection rate.

At 742, the port control module via the ISR checks if timer values in the WWN table are valid for the current initiator. The timer values in the WWN table may refer to a previous timer context for the current initiator. The timer values include the nexus, arbitration wait and pathway block timer values. The timer values are valid when the timer values are not equal to 0. If one of the timer values is not equal to 0 then task 744 is performed, otherwise task 748 is performed.

At 744, the port control module via the ISR accesses the WWN table and obtains the timer values in the WWN table and updates the timer registers of the link line memory. The timer values stored in the WWN table are stored in the timer registers. At 746, the port control module via the ISR clears the timer context fields in the WWN table to 0.

At 748, the port control module via the ISR clears the index-to-WWN interrupt. Task 706 is performed subsequent to task 748.

Context Switching and Block Preventing

In a multi-initiator environment, an initiator may not be ready to accept an open request when a target device (e.g., the target module) attempts to open a connection with the initiator. As a result, the initiator may send an open reject class primitive to the target device to retry the open request. The target device may continue to retry the open request until a timer expires (e.g., a nexus timer times out). The target device may abort transmitting the open request when the timer times out. The next time that the initiator sends an open request to the target device, the target device may generate an attention condition signal indicating the nexus timer expired in a previous connection or session.

A target device may block communication with other initiators when attempting to connect with a first initiator. The below-described method includes preventing blocking when a target device is in a retry state with an initiator. The target module retries opening a connection with an initiator for a shortened predetermined period compared to a predetermined period of a nexus timer. For example, the shortened predetermined period may be less than the predetermined period of the nexus timer (e.g., 2 s).

If (i) the SCSI control module sends a transmit request to connect to a second initiator that is different than a current (first) initiator and (ii) a predetermined number of connection attempts have been conducted for the current initiator, a port control module may perform a temporary context switch. The context switch may be to the second initiator. The port control module may return to the first initiator after servicing the transmit request for the second initiator. State of the timer values in a timer set may be temporarily stored in a WWN table and recalled when reestablishing a connection with the second initiator.

Figure 11A:
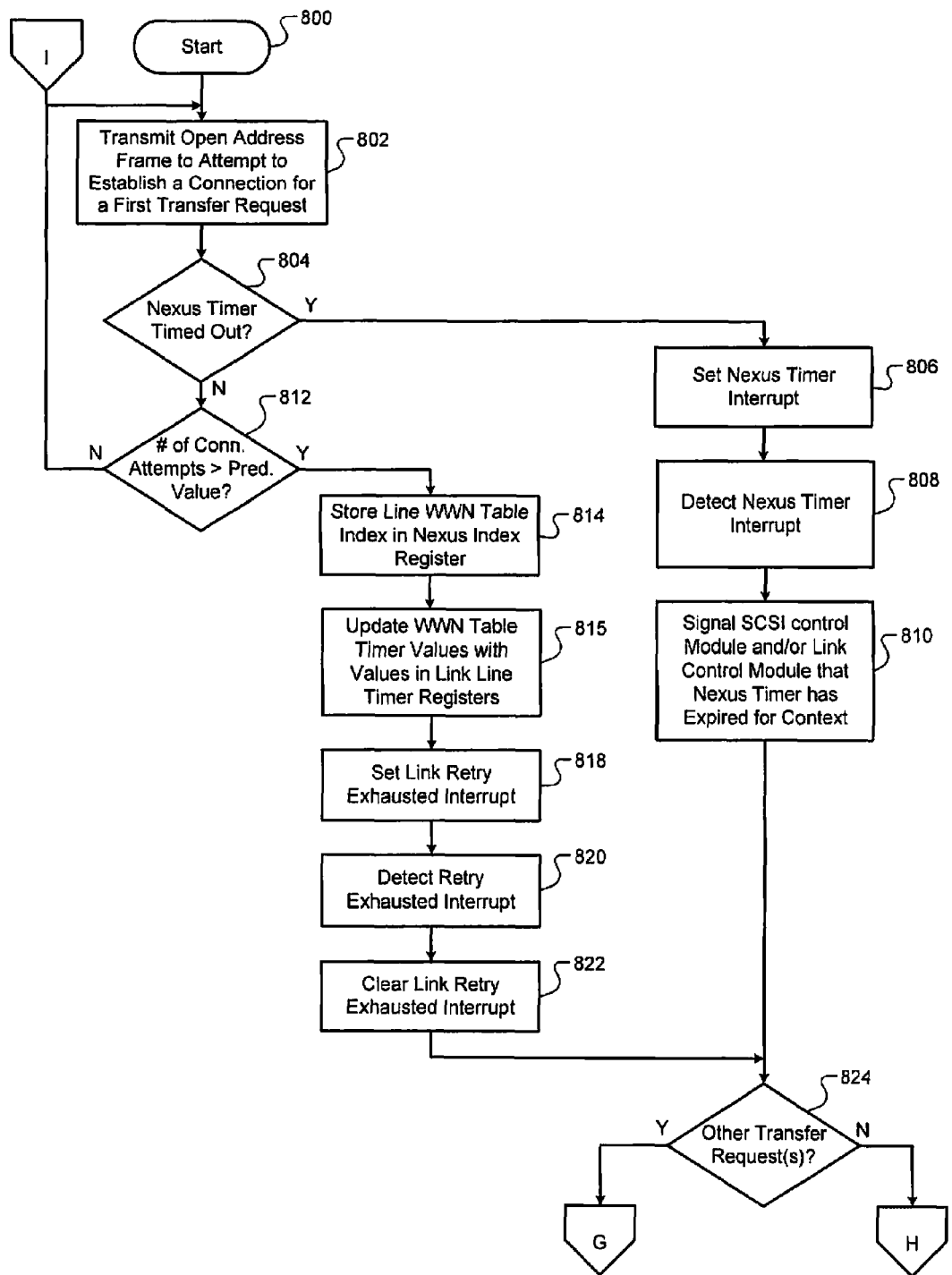
FIGS. 11A and 11B illustrate a method of managing context switching while preventing blocking in accordance with the present disclosure.
Figure 11B:
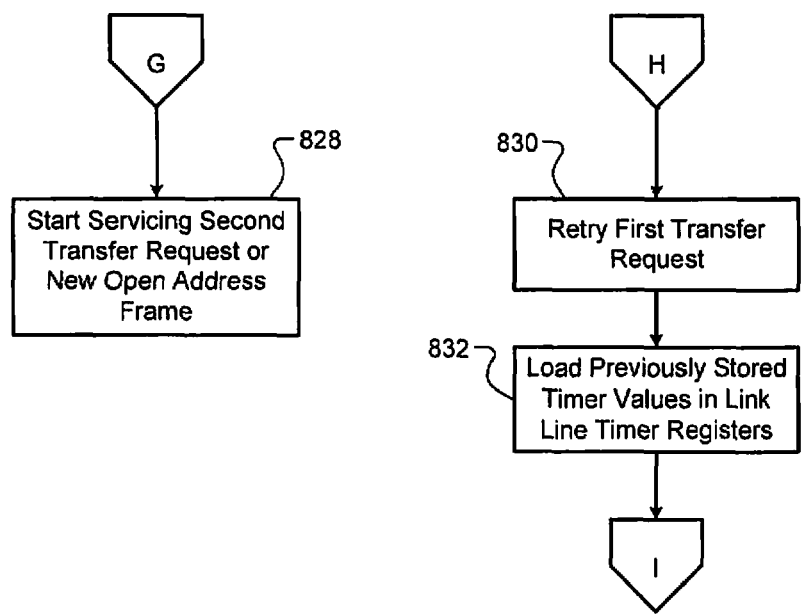

In FIGS. 11A and 11B, a method of managing context switching while preventing blocking is shown. Although the following tasks are primarily described with respect to the implementations of FIGS. 7 and 8, the tasks may be easily modified to apply to other implementations of the present disclosure. The tasks may be iteratively performed. The method may begin at 800.

At 802, a link module transmits an open address frame to attempt to establish a connection with a current initiator. This open address frame may be transmitted, for example, based on a SCSI transfer request (first transfer request) from a SCSI control module.

At 804, the link module determines whether a nexus timer (i.e. value of a nexus timer register) for the current initiator has timed out. The nexus timer may timeout when (i) the value of the nexus timer register decrements to 0 and/or (ii) the value of the nexus timer register increments and exceeds a timeout value. Task 806 is performed when the nexus timer times out, otherwise task 812 is performed.

At 806, the link module sets a nexus timer interrupt. At 808, a port control module associated with the link module via an ISR detects the nexus timer interrupt. At 810, the port control module via the ISR signals the SCSI control module and/or the link module that the nexus timer has expired for the current initiator or context. Task 824 is performed subsequent to task 810.

At 812, the link module determines whether a number of connection attempts with the current initiator is greater than a predetermined value. Task 814 is performed when the number of connection attempts is greater than the predetermined value, otherwise the link module may return to task 802.

At 814, the link module stores a current line WWN table index into a nexus index register. At this point, link line timer registers of the link module have timer values for the current line WWN table index (value stored in the nexus index register). At 815, the link module stores timer values in the link line timer registers in the WWN table for the current initiator. The timer values may include nexus, arbitration wait, and pathway block timer values. The link module may store other WWN information in the WWN table for the current initiator. The link module may store the WWN information since the nexus index is valid (greater than 0). Task 815 may be performed when a WWN-to-index or index-to-WWN interrupt is set by the link module.

At 816, the link module sets the line WWN table index to 0. This causes the link line register values to no longer be valid. At 818, the link module sets a transport level retry exhausted interrupt. At 820, the port control module via the ISR detects the retry exhausted interrupt.

At 822, the port control module via the ISR clears the retry exhausted interrupt. At 824, the port control module via the ISR checks if (i) another (second) SCSI transfer request and/or (ii) an open address frame is received by the link module from an initiator (the current initiator or another initiator). Task 828 is performed when there is another SCSI transfer request and/or an open address frame has been received from an initiator. Task 830 is performed otherwise.

At 828, the port control module via the ISR instructs (i) the SCSI control module to start servicing the next pending SCSI transfer request and/or (ii) the link module to start servicing the open address frame of 822. The method of FIGS. 9A and 9B or portions of the method of FIGS. 9A and 9B may be performed when an open address frame is received. A WWN-to-index interrupt may be generated when an open address frame is received. The method of FIGS. 10A and 10B or portions of the method of FIGS. 10A and 10B may be performed when a SCSI transfer request is pending.

At 830, the port control module via the ISR signals the SCSI control module to retry the first transfer request. The port control module signals the SCSI control module to retry attempting to establish a connection with the current initiator. At 832, the WWN information stored at 815 may be reloaded into the link line registers. Task 802 may be performed subsequent to task 832.

Figure 12:
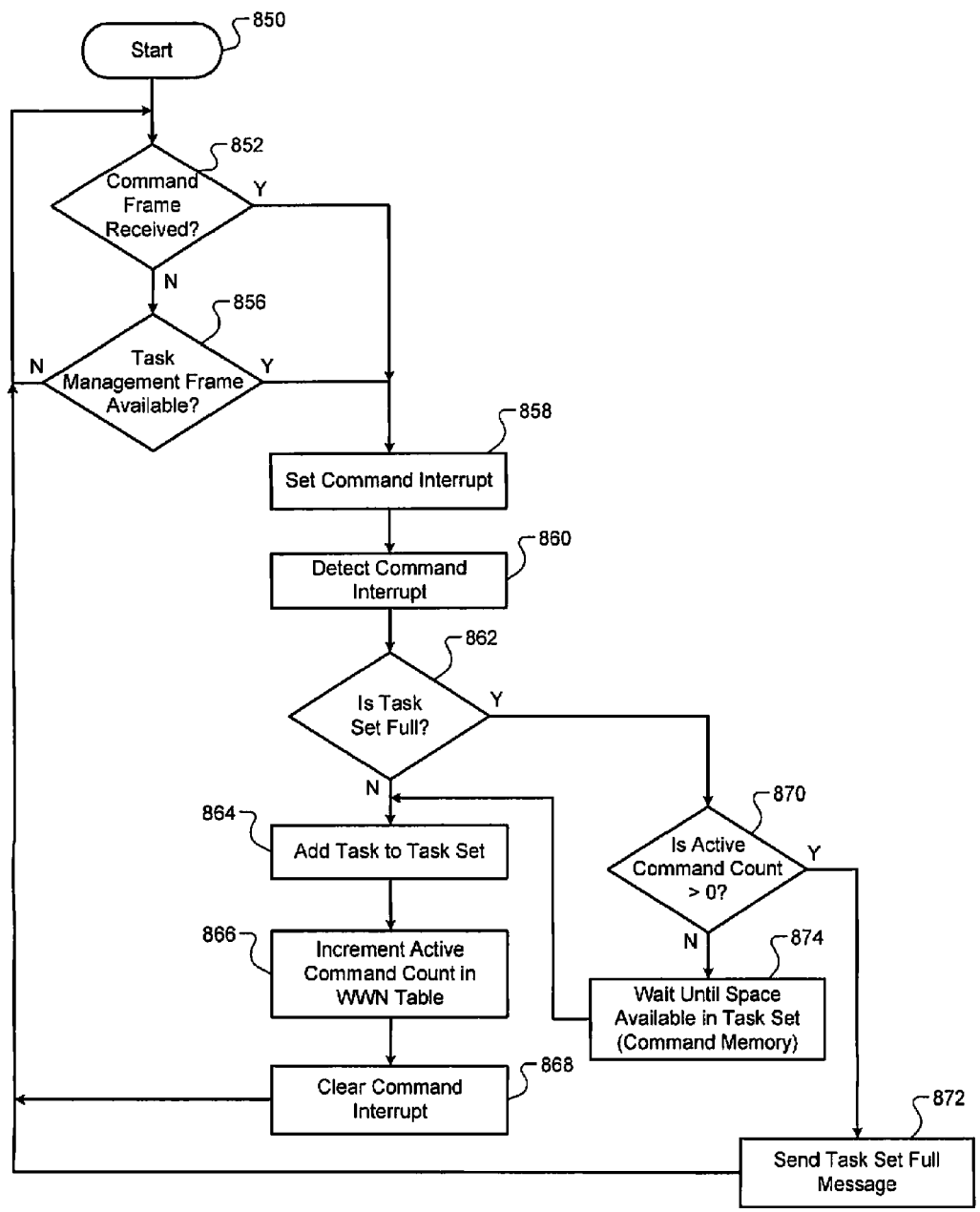
FIG. 12 illustrates a method of incrementing an active command count in accordance with the present disclosure.

In FIG. 12, a method of incrementing an active command count is shown. Although the following tasks are primarily described with respect to the implementations of FIGS. 7 and 8, the tasks may be easily modified to apply to other implementations of the present disclosure. The tasks may be iteratively performed. The method may begin at 850.

At 852, a port and/or a SCSI control module determines whether a new command frame (i.e. not currently stored in the command memory) is received (and/or available) from an initiator. Task 854 is performed when a command frame is received, otherwise task 856 is performed.

At 856, the port and/or the SCSI control module determine whether a new task management frame (i.e. currently generated and/or not stored in the command memory or other memory) is received (and/or available). At 858, the target module sets a command interrupt to indicate that a command frame or a task management frame is received.

At 860, the port control module via an ISR detects one of the command interrupts. At 862, the port control module via an ISR determines whether a task set is full. The task set may be full, for example, when the command memory can not store any additional command and/or task management frames. Task 864 is performed when the task set is not full. Task 870 is performed when the task set is full.

At 864, the command frame or the task management frame is added to the task set (e.g., stored in the command memory). At 866, the port control module via an ISR increments an active command count in a WWN table entry of a WWN table for a current WWN table index. The current WWN table index is a WWN table index stored in link line memory at this point. At 868, the port control module via an ISR clears the command interrupt triggered at 854 or 858.

At 870, the port control module via an ISR determines whether the active command count is greater than 0. If the active command count is greater than 0 then task 872 is performed, otherwise task 874 is performed. At 872, the port control module via an ISR sends a task set full message. The task set full message may be sent to the link module and/or the SCSI control module. Task 852 may be performed subsequent to task 872.

At 874, the port control module via an ISR may wait until space is available to allow at least one command to be stored for the initiator associated with the command or task management frame. The port control module refrains from incrementing the active command count until a space is available. Task 864 may be performed subsequent to task 874.

Figure 13:
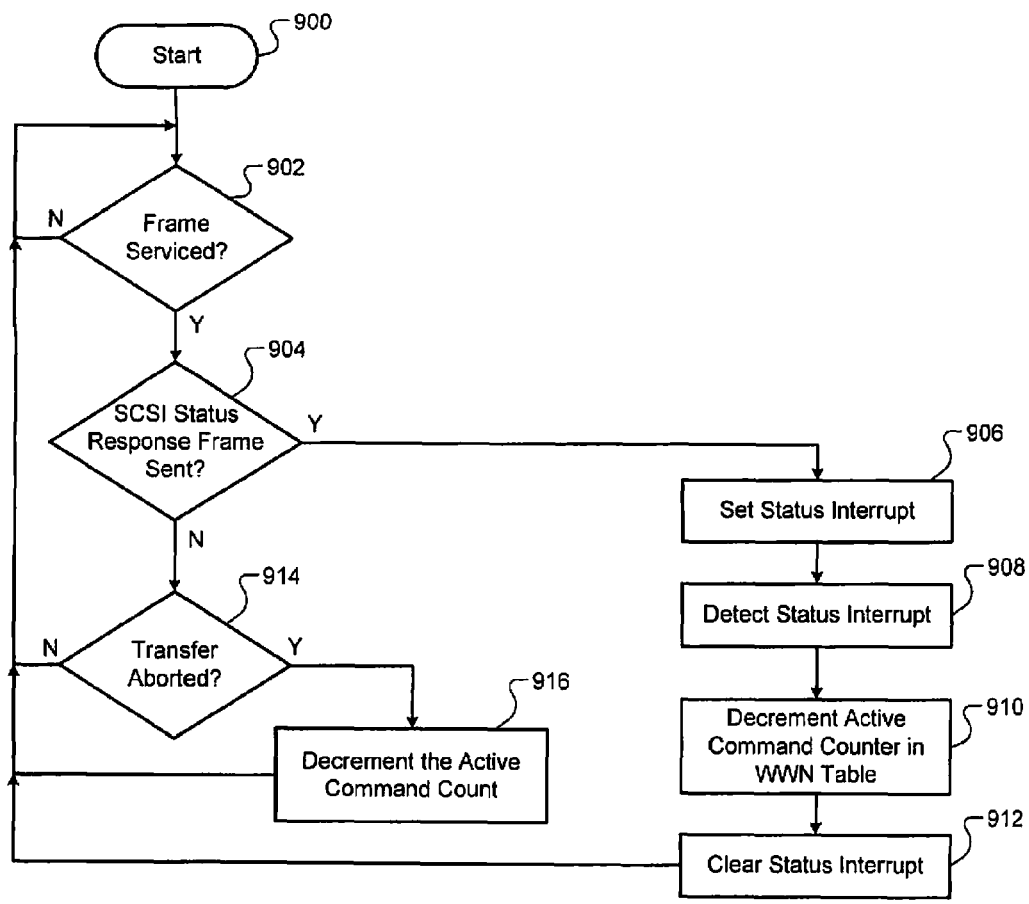
FIG. 13 illustrates a method of decrementing an active command count in accordance with the present disclosure.

In FIG. 13, a method of decrementing an active command count is shown. The method of FIG. 13 may be used with the method of FIG. 12 when managing an active command count. Although the following tasks are primarily described with respect to the implementations of FIGS. 7 and 8, the tasks may be easily modified to apply to other implementations of the present disclosure. The tasks may be iteratively performed. The method may begin at 900.

At 902, a link module, a port control module and/or a SCSI control module may determine whether a command frame or a task management frame is serviced for an initiator. The initiator is identified by of a current line WWN table index in a link line register. For example, a command frame may be serviced when transfer of data associated with the command frame is completed. Task 904 is performed when a frame has been serviced.

At 904, the port control module may determine whether a SCSI status response frame has been sent from the SCSI control module to the port. Task 906 is performed when a SCSI status response frame has been sent, otherwise task 914 is performed.

At 906, the target module sets a status interrupt to indicate that a SCSI status response frame has been sent. At 908, the port control module via an ISR detects the status interrupt. At 910, the port control module via an ISR decrements an active command counter in a WWN table entry for the initiator. At 912, the port control module via an ISR clears the status interrupt.

At 914, a link module, a port control module and/or the SCSI control module determines whether servicing of the frame of task 902 is aborted. Task 916 is performed when the servicing is aborted, otherwise task 902 is performed. At task 916, the SCSI control module issues a request to decrement the active command count for the initiator.

The above-described tasks of FIGS. 9A-13 are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a first memory comprising a first plurality of arrays, wherein the first memory is configured to store an interrupt service routine, and wherein each of the first plurality of arrays is configured to store a respective plurality of fields;
a first register; and
a first port connected to a plurality of initiators of a host device, wherein the plurality of initiators includes a first initiator and a second initiator, and wherein the first port includes
a first physical layer device configured to (i) transfer a first frame between the first port and the first initiator, wherein the first frame includes first information, and wherein the first information includes a first world wide name address and a first connection rate, and (ii) transfer a second frame between (a) the first port and (b) the first initiator or the second initiator, wherein the second frame includes second information, wherein the second information includes a second world wide name address and a second connection rate, and
wherein the first physical layer device is configured to (i) compare the second information to the first information, (ii) if the second information does not match the first information, generate an interrupt to interrupt servicing of the first frame, and (iii),
a first control module configured to (i) store an index value in the first register, wherein the index value refers to one of the first plurality of arrays for the second frame, (ii) based on the interrupt, execute the interrupt service routine to service the second frame, wherein the second frame is serviced based on the plurality of fields in the one of the first plurality of arrays, and (iii) subsequent to completing servicing of the second frame, clear the interrupt and returning to servicing the first frame.

2. The system of claim 1, wherein:
the first plurality of arrays comprise a second array of fields for the first frame; and
the first control module is configured to service the first frame based on the plurality of fields in the second array of fields.

3. The system of claim 1, wherein the first port is configured to perform (i) a first context switch to service the second frame and communicate at the second connection rate with the first initiator or the second initiator, and (ii) a second context switch to return to servicing the first frame and communicating with the first initiator at the first connection rate.

4. The system of claim 1, further comprising a plurality of registers separate from the first memory, wherein:
the first physical layer device is configured to (i) subsequent to initiating servicing of the first frame and based on the interrupt, store the first information in the first memory, (ii) subsequent to storing the first information in the first memory, store the second information in the plurality of registers;
the first control module is configured to, subsequent to the second information being stored in the plurality of registers, service the second frame;
the first physical layer device is configured to, subsequent to the second frame being serviced, reload the first information from the first memory into the plurality of registers; and
the first control module is configured to, subsequent to the first information being reloaded into the plurality of registers, complete servicing of the first frame.

5. The system of claim 1, wherein:
the first control module is configured to, if the first memory is full, allocate a portion of a second memory for storage of the first information, and
the second memory is separate from the first port.

6. The system of claim 1, wherein the second frame is transferred between the first port and the first initiator.

7. The system of claim 1, wherein the second frame is transferred between the first port and the second initiator.

8. The system of claim 1, wherein the first control module is configured to determine whether to service the second frame using (i) the first connection rate, or (ii) the second connection rate based on a connection rate in the one of the first plurality of arrays.

9. A serial attached small computer systems interface module comprising:
the system of claim 1;
a second memory comprises a second plurality of arrays, wherein each of the second plurality of arrays is configured to store a respective plurality of fields; and
a second port connected to the plurality of initiators, wherein the second port includes
a second physical layer device configured to (i) transfer a third frame between (a) the second port and (b) the first initiator or the second initiator, wherein the third frame includes third information, wherein the third information includes a third world wide name address and a third connection rate, and
a second control module configured to service the third frame based on the plurality of fields in one of the second plurality of arrays.

10. The serial attached small computer systems interface module of claim 9, wherein:
the first control module is configured to store a first table;
the first table comprises the fields in first plurality of arrays;
the first plurality of arrays are configured to store respectively a first plurality of connection rates;
the first plurality of connection rates comprise the first connection rate and the second connection rate;
each of the first plurality of connection rates is a last connection rate of a respective one of the plurality of initiators with the first physical layer device;
the second control module is configured to store a second table;
the second table comprises the fields in the second plurality of arrays;
the second plurality of arrays are configured to store respectively a second plurality of connection rates;
the second plurality of connection rates comprise the third connection rate; and
each of the second plurality of connection rates is a last connection rate of a respective one of the plurality of initiators with the second physical layer device.

11. The serial attached small computer systems interface module of claim 9, wherein:
the first control module comprises the first memory;
the first physical layer device comprises the first register; and
the second control module comprises the second memory.

12. The serial attached small computer systems interface module of claim 9, further comprising a third memory shared by the first port and the second port, wherein:
the first port is configured to store first descriptors or first active commands in the third memory
the first descriptors and the first active commands correspond to transfers of data between the first port and the plurality of initiators;
the second port is configured to store second descriptors or second active commands in the third memory; and
the second descriptors and the second active commands correspond to transfers of data between the second port and the plurality of initiators.

13. A method of operating a system, wherein the system includes a first memory, a first register, and a first port, wherein the first port is connected to a plurality of initiators of a host device, wherein the plurality of initiators includes a first initiator and a second initiator, wherein the first port comprise a first physical layer device and a first control module, wherein the first memory comprises a first plurality of arrays, and wherein each of the first plurality of arrays is configured to store a respective plurality of fields, the method comprising:
storing in the first memory an interrupt service routine;
transferring a first frame, via the first physical layer device, between the first port and the first initiator, wherein the first frame includes first information, and wherein the first information includes a first world wide name address and a first connection rate;
transferring a second frame between (a) the first port and (b) the first initiator or the second initiator, wherein the second frame includes second information, and wherein the second information includes a second world wide name address and a second connection rate; and
via the first physical layer device,
storing an index value in the first register, wherein the index value refers to one of the first plurality of arrays for the second frame,
comparing the second information to the first information, and
if the second information does not match the first information, generating an interrupt to interrupt servicing of the first frame, and
via the first control module,
based on the interrupt, executing the interrupt service routine to service the second frame, wherein the second frame is serviced based on the plurality of fields in the one of the first plurality of arrays, and
subsequent to completing servicing of the second frame, clearing the interrupt and returning to servicing the first frame.

14. The method of claim 13, further comprising servicing the first frame via the first control module based on a plurality of fields in a second array of fields for the first frame, wherein the first plurality of arrays comprise the second array of fields.

15. The method of claim 13, further comprising, via the first port, performing (i) a first context switch to service the second frame and communicate at the second connection rate with the first initiator or the second initiator, and (ii) a second context switch to return to servicing the first frame and communicating with the first initiator at the first connection rate.

16. The method of claim 13, further comprising:
via the first physical layer device,
subsequent to initiating servicing of the first frame and based on the interrupt, storing the first information in the first memory, and
subsequent to storing the first information in the first memory, storing the second information in a plurality of registers, wherein the plurality of registers are separate from the first memory;
subsequent to the second information being stored in the plurality of registers, servicing the second frame via the first control module;
subsequent to the second frame being serviced, reloading the first information from the first memory into the plurality of registers via the first physical layer device; and
subsequent to the first information being reloaded into the plurality of registers, completing servicing of the first frame.

17. The method of claim 13, further comprising, if the first memory is full, allocating a portion of a second memory for storage of the first information, wherein the second memory is separate from the first port.

18. The method of claim 13, wherein the second frame is transferred between the first port and the first initiator.

19. The method of claim 13, wherein the second frame is transferred between the first port and the second initiator.

20. The method of claim 13, further comprising:
storing a plurality of fields in each of a second plurality of arrays, wherein the second plurality of arrays are in a second memory;
transferring, via a second physical layer device, a third frame between (a) a second port and (b) the first initiator or the second initiator, wherein the third frame includes third information, wherein the third information includes a third world wide name address and a third connection rate; and
servicing the third frame via a second control module based on the plurality of fields in one of the second plurality of arrays,
wherein the second physical layer device and the second control module are in the second port, and wherein the second port is connected to the plurality of initiators.

* * * * *